(12) United States Patent
Fan et al.

(10) Patent No.: US 11,941,610 B2
(45) Date of Patent: Mar. 26, 2024

(54) CRYPTOCURRENCY SECURING SYSTEM AND METHOD

(71) Applicant: CIRCLE INTERNET FINANCIAL, LTD., Dublin (IE)

(72) Inventors: Chi-Huang Fan, Taipei (TW); Chien-Yang Hsu, Miaoli County (TW); Ming-Chang Shih, Kaohsiung (TW)

(73) Assignee: CIRCLE INTERNET FINANCIAL, LTD, Dublin (IE)

( * ) Notice: Subject to any disclaimer, the term of this patent is extended or adjusted under 35 U.S.C. 154(b) by 838 days.

(21) Appl. No.: 16/509,521

(22) Filed: Jul. 12, 2019

(65) Prior Publication Data
US 2020/0019959 A1  Jan. 16, 2020

Related U.S. Application Data

(60) Provisional application No. 62/697,591, filed on Jul. 13, 2018.

(51) Int. Cl.
| | | |
|---|---|---|
| *G06Q 20/36* | (2012.01) | |
| *G06Q 20/06* | (2012.01) | |
| *G06Q 20/38* | (2012.01) | |
| *G06Q 20/42* | (2012.01) | |
| *H04L 9/06* | (2006.01) | |

(52) U.S. Cl.
CPC ..... *G06Q 20/3674* (2013.01); *G06Q 20/0658* (2013.01); *G06Q 20/3825* (2013.01); *G06Q 20/3827* (2013.01); *G06Q 20/425* (2013.01); *H04L 9/0637* (2013.01)

(58) Field of Classification Search
CPC ............................................ G06Q 20/00–425
See application file for complete search history.

(56) References Cited

U.S. PATENT DOCUMENTS

| | | |
|---|---|---|
| 7,039,809 B1 | 5/2006 | Wankmueller |
| 8,667,281 B1 | 3/2014 | Chenna |
| 9,432,186 B2 | 8/2016 | Ni et al. |
| 10,594,486 B1 | 3/2020 | Trachtman |
| 2007/0297610 A1 | 12/2007 | Chen et al. |

(Continued)

FOREIGN PATENT DOCUMENTS

| | | |
|---|---|---|
| EP | 0821504 A2 | 1/1998 |
| EP | 1131911 B1 | 11/1999 |

(Continued)

*Primary Examiner* — Mohammad A. Nilforoush
(74) *Attorney, Agent, or Firm* — Dinsmore & Shohl, LLP

(57) ABSTRACT

The present disclosure provides a cryptocurrency securing system and a cryptocurrency securing method thereof. The system receives a cryptocurrency transaction information from a user device, and determines whether a policy data corresponding to the cryptocurrency transaction information is legal. When the policy data corresponding to the cryptocurrency transaction information is legal, the system derives a cryptocurrency private key information via a personal identification number of the user device. The system then encrypts the cryptocurrency transaction information via the cryptocurrency private key information for deriving an encrypted cryptocurrency transaction information, and broadcasts the encrypted cryptocurrency transaction information to a blockchain network.

20 Claims, 20 Drawing Sheets

(56) References Cited

U.S. PATENT DOCUMENTS

| | | |
|---|---|---|
| 2012/0294445 A1 | 11/2012 | Radutskiy et al. |
| 2013/0007464 A1 | 1/2013 | Madden |
| 2013/0034019 A1* | 2/2013 | Mustajarvi ............ H04W 48/16 370/254 |
| 2015/0213433 A1 | 7/2015 | Khan |
| 2015/0254640 A1 | 9/2015 | Cassano et al. |
| 2015/0310431 A1 | 10/2015 | Lakshmanan et al. |
| 2015/0324789 A1 | 11/2015 | Dvorak et al. |
| 2016/0014110 A1 | 1/2016 | Kurspahic |
| 2016/0112413 A1 | 4/2016 | Wang |
| 2016/0212109 A1 | 7/2016 | Hird |
| 2017/0063531 A1 | 3/2017 | Sullivan |
| 2017/0132626 A1* | 5/2017 | Kennedy ............... G06Q 20/065 |
| 2018/0101906 A1* | 4/2018 | Mcdonald ............ G06Q 20/204 |
| 2019/0245688 A1* | 8/2019 | Patin ....................... H04L 9/321 |
| 2019/0318356 A1 | 10/2019 | Martin et al. |
| 2020/0013052 A1 | 1/2020 | Fok et al. |
| 2020/0374113 A1 | 11/2020 | Noam et al. |

FOREIGN PATENT DOCUMENTS

| | | |
|---|---|---|
| WO | 9933222 A1 | 12/1998 |
| WO | 2011036179 A1 | 3/2011 |
| WO | 2019106006 A1 | 6/2019 |

\* cited by examiner

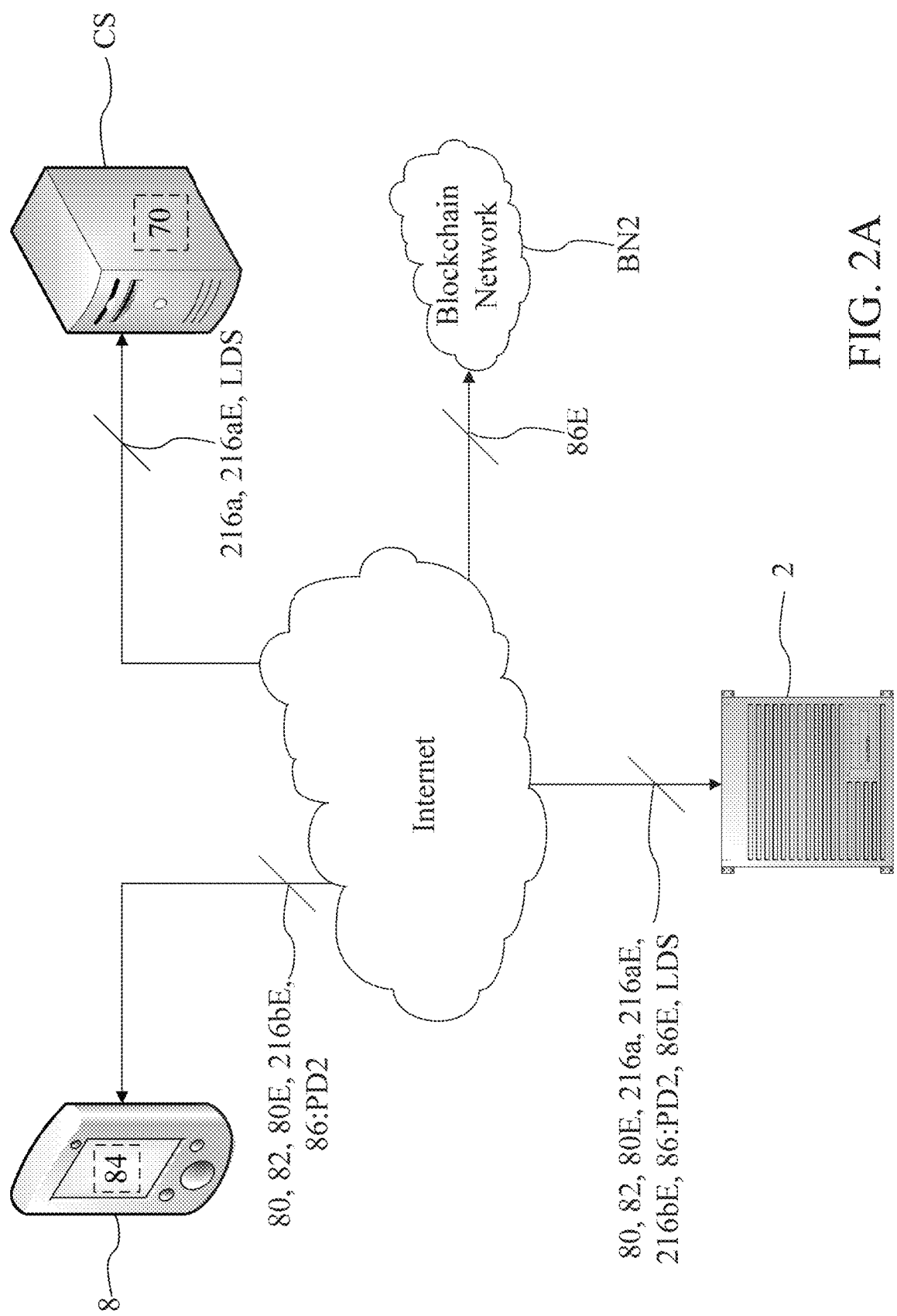

CRYPTOCURRENCY SECURING SYSTEM AND METHOD

PRIORITY CLAIM AND CROSS-REFERENCE

This application claims the benefit of prior-filed provisional application No. 62/697,591, filed on Jul. 13, 2018.

BACKGROUND

Digital currencies and the transactions thereof have become increasingly prevalent. It uses cryptography to secure digital currencies and verify transactions so that these digital currencies are referred to as cryptocurrency. In order to exchange cryptocurrency, corresponding cryptocurrency wallet is required.

Particularly, cryptocurrency wallets can be implemented by some storage hardware (e.g., cloud storage, or local storage such as hard driver disk/solid-state drive) designed to store public and private keys, which are used to receive and spend corresponding cryptocurrencies, respectively. For different purposes, different types of cryptocurrency wallets are developed and the most common types of cryptocurrency wallets cab be classified as Hot Wallet and Cold Wallet.

More specifically, Hot Wallet connects to the Internet directly for regular uses and trading in real-time. Although it is capable of providing a convenient access to cryptocurrency, a user-friendly interface, and a streamlined payment process, Hot Wallet is vulnerable to cyberattacks because it is on-line operation. Hence, it is at a high risk of losing cryptocurrency using Hot Wallet.

In contrast to Hot Wallet, Cold Wallet which is stored in a personal off-line storage does not connect to the Internet actively, and the infrequent uses and trades are achieved as non-real time. Therefore, Cold Wallet is capable of defending cyberattacks and is ideal for long-term safekeeping. Nevertheless, Cold Wallet lacks accessibility and flexibility, and is still vulnerable to physical damage, operation errors or theft while the Cold Wallet is kept personally without redundancy.

A general two-layer wallet system which includes Hot Wallet and Cold Wallet is therefore proposed. However, in normal circumstances, two-layer wallet system still has the described disadvantages of Hot and Cold Wallets since the required balance between security of Cold Wallet and real-time trading of Hot Wallet is not easy to reach. Moreover, there are still technical problems needed to be overcome in two-layer wallet system because the security architecture of two-layer wallet system is not robust enough.

SUMMARY

The present disclosure provides a cryptocurrency securing system. The cryptocurrency securing system includes a first apparatus. The first apparatus includes a first network interface and a first controller. The first controller is configured to perform a first operating system for: causing the first network interface to receive a cryptocurrency transaction information from a first user device through a second apparatus; determining whether a policy data corresponding to the cryptocurrency transaction information is legal; deriving a cryptocurrency private key information via a personal identification number of the first user device when the policy data corresponding to the cryptocurrency transaction information is legal; encrypting the cryptocurrency transaction information via the cryptocurrency private key information for deriving an encrypted cryptocurrency transaction information; causing the first network interface to transmit the encrypted cryptocurrency transaction information to a blockchain network through the second apparatus.

In some embodiments, the cryptocurrency securing system further includes the second apparatus. The second apparatus includes a second network interface and a second controller. The second controller is configured to perform a second operating system for causing the second network interface to: receive the cryptocurrency transaction information from the first user device; transmit the cryptocurrency transaction information to the first apparatus.

In some embodiments, the second controller is configured to perform the second operating system for causing the second network interface to: receive the encrypted cryptocurrency transaction information from the first apparatus; transmit the encrypted cryptocurrency transaction information to the blockchain network through a third apparatus.

In some embodiments, the first operating system is performed under a first network section and the second operating system is performed under a second network section. The first network section and the second network section are independent.

In some embodiments, the cryptocurrency securing system further includes the third apparatus. The third apparatus includes a third network interface and a third controller. The third controller is configured to perform a third operating system for causing the third network interface to: receive the encrypted cryptocurrency transaction information from the second apparatus; broadcast the encrypted cryptocurrency transaction information to the blockchain network.

In some embodiments, the first operating system is performed under a first network section, the second operating system is performed under a second network section, and the third operating system is performed under a third network section. The first network section, the second network section and the third network section are independent.

In some embodiments, the second controller is configured to perform the second operating system for causing the second network interface to: notify at least one second user device of the encrypted cryptocurrency transaction information; receive at least one approval information from the at least one second user device after notifying the at least one second user device of the encrypted cryptocurrency transaction information. The encrypted cryptocurrency transaction information is transmitted to the blockchain network through the third apparatus based on the at least one approval information.

In some embodiments, the second controller is configured to perform the second operating system for causing the second network interface to: notify at least one third user device of transmitting the encrypted cryptocurrency transaction information to the blockchain network.

In some embodiments, the first apparatus further includes a storage unit. The storage unit is configured to store a legal digital signature. The first controller is further configured to perform the first operating system for: hashing the policy data for deriving a digital signature; and determining whether the digital signature of the policy data matches the legal digital signature, wherein the policy data corresponding to the cryptocurrency transaction information is legal when the digital signature of the policy data matches the legal digital signature.

In some embodiments, the legal digital signature is generated by a cloud server based on a legal policy data. The first controller is configured to perform the first operating system for: causing the first network interface to receive the legal digital signature from the cloud server; storing the legal digital signature in the storage unit.

In some embodiments, the second controller is configured to perform the second operating system for causing the second network interface to: receive the personal identification number from the first user device; transmit the personal identification number to the first apparatus. The first controller is configured to perform the first operating system for: determining whether the personal identification number corresponds to the first user device. The cryptocurrency transaction information is received from the first user device when the personal identification corresponds to the first user device.

In some embodiments, the second controller is configured to perform the second operating system for causing the second network interface to: receive the personal identification number from the first user device; transmit the personal identification number to the first apparatus. The first controller is configured to perform the first operating system for: determining whether the personal identification number corresponds to the first user device; causing the first network interface to notify a cloud server of receiving the personal identification number when the personal identification number corresponds to the first user device so that the cloud server is capable of determining whether the first user device is legal via receiving authentication information from the first user device; causing the first network interface to receive a response from the cloud server when the first user device is determined legal by the cloud server. The cryptocurrency transaction information is received from the first user device based on the response.

In some embodiments, the storage unit is configured to store a first asymmetric key, an encrypted personal key, and an encrypted cryptocurrency private key information. The second controller is further configured to perform the second operating system for causing the second network interface to: receive an encrypted personal identification number from the first user device; transmit the encrypted personal identification number to the first apparatus. The first controller is further configured to perform the first operating system for: decrypting the encrypted personal identification number via the first asymmetric key for deriving the personal identification number; decrypting the encrypted personal key via the personal identification number for deriving a personal key; and decrypting the encrypted cryptocurrency private key information via the personal key for deriving the cryptocurrency private key information.

In some embodiments, the first controller is further configured to perform the first operating system for: generating a first one-time key; encrypting the first one-time key via the first asymmetric key for deriving a first encrypted one-time key; and causing the first network interface to transmit the first encrypted one-time key to the first user device so that the first user device is capable of decrypting the first encrypted one-time key via a second asymmetric key for deriving the first one-time key, and encrypting the personal identification number via the first one-time key and the second asymmetric key for deriving the encrypted personal identification number, wherein the first asymmetric key is paired with the second asymmetric key.

In some embodiments, the first controller is further configured to perform the first operating system for: decrypting the encrypted personal identification number via the first asymmetric key for deriving a sub-encrypted personal identification number; and decrypting the sub-encrypted personal identification number via the first one-time key for deriving the personal identification number.

In some embodiments, the first controller is further configured to perform the first operating system for: causing the first network interface to transmit a second encrypted one-time key to a cloud server so that the cloud server is capable of decrypting the second encrypted one-time key via a third asymmetric key for deriving a second one-time key; causing the first network interface to receive the second one-time key from the cloud server; decrypting a first encrypted hash factor data via the second one-time key for deriving a hash factor data; decrypting the encrypted personal key via the personal identification number and the hash factor data for deriving the personal key.

In some embodiments, the first controller is further configured to perform the first operating system for: hashing the personal identification number and the hash factor data for deriving a hash key; and decrypting the encrypted personal key via the hash key for deriving the personal key.

In some embodiments, the first controller is further configured to perform the first operating system for: generating a third one-time key; encrypting the hash factor data via the third one-time key for deriving a second encrypted hash factor data; and encrypting the third one-time key via a fourth asymmetric key for deriving a third encrypted one-time key, wherein the third asymmetric key is paired with the fourth asymmetric key.

Another primary objective of the present disclosure is to provide a cryptocurrency securing method for use in a cryptocurrency securing system. The method includes: receiving, by the cryptocurrency securing system, a cryptocurrency transaction information from a first user device; determining, by the cryptocurrency securing system, whether a policy data corresponding to the cryptocurrency transaction information is legal; deriving, by the cryptocurrency securing system, a cryptocurrency private key information via a personal identification number of the first user device when the policy data corresponding to the cryptocurrency transaction information is legal; encrypting, by the cryptocurrency securing system, the cryptocurrency transaction information via the cryptocurrency private key information for deriving an encrypted cryptocurrency transaction information; and broadcasting, by the cryptocurrency securing system, the encrypted cryptocurrency transaction information to a blockchain network.

In some embodiments, the method further includes: notifying, by the cryptocurrency securing system, at least one second user device of the encrypted cryptocurrency transaction information; receiving, by the cryptocurrency securing system, at least one approval information from the at least one second user device after notifying the at least one second user device of the encrypted cryptocurrency transaction information; wherein the encrypted cryptocurrency transaction information is broadcasted to the blockchain network based on the at least one approval information.

In some embodiments, the cryptocurrency securing system stores a legal digital signature. Determining whether the policy data corresponding to the cryptocurrency transaction information is legal further includes: hashing, by the cryptocurrency securing system, the policy data for deriving a digital signature; determining, by the cryptocurrency securing system, whether the digital signature of the policy data matches the legal digital signature, wherein the policy data corresponding to the cryptocurrency transaction information is legal when the digital signature of the policy data matches the legal digital signature.

In some embodiments, the legal digital signature is generated by a cloud server based on a legal policy data. The method further includes: receiving, by the cryptocurrency securing system, the legal digital signature from the cloud server; and storing, by the cryptocurrency securing system, the legal digital signature.

In some embodiments, the method further includes: notifying, by the cryptocurrency securing system, at least one third user device of broadcasting the encrypted cryptocurrency transaction information to the blockchain network.

In some embodiments, the method further includes: receiving, by the cryptocurrency securing system, the personal identification number from the first user device; determining, by the cryptocurrency securing system, whether the personal identification number corresponds to the first user device; wherein the cryptocurrency transaction information is received from the first user device when the personal identification corresponds to the first user device.

In some embodiments, the method further includes: receiving, by the cryptocurrency securing system, the personal identification number from the first user device; determining, by the cryptocurrency securing system, whether the personal identification number corresponds to the first user device; notifying, by the cryptocurrency securing system, a cloud server of receiving the personal identification number when the personal identification number corresponds to the first user device so that the cloud server is capable of determining whether the first user device is legal via receiving authentication information from the first user device; receiving, by the cryptocurrency securing system, a response from the cloud server when the first user device is determined legal by the cloud server; wherein the cryptocurrency transaction information is received from the first user device based on the response.

In some embodiments, deriving the cryptocurrency private key information via the personal identification number of the first user device further includes: receiving, by the cryptocurrency securing system, an encrypted personal identification number from the first user device; decrypting, by the cryptocurrency securing system, the encrypted personal identification number via a first asymmetric key for deriving the personal identification number; decrypting, by the cryptocurrency securing system, an encrypted personal key via the personal identification number for deriving a personal key; and decrypting, by the cryptocurrency securing system, an encrypted cryptocurrency private key information via the personal key for deriving the cryptocurrency private key information.

In some embodiments, deriving the cryptocurrency private key information via the personal identification number of the first user device further includes: generating, by the cryptocurrency securing system, a first one-time key; encrypting, by the cryptocurrency securing system, the first one-time key via the first asymmetric key for deriving a first encrypted one-time key; and transmitting, by the cryptocurrency securing system, the first encrypted one-time key to the first user device so that the first user device is capable of decrypting the first encrypted one-time key via a second asymmetric key for deriving the first one-time key, and encrypting the personal identification number via the first one-time key and the second asymmetric key for deriving the encrypted personal identification number, wherein the first asymmetric key is paired with the second asymmetric key.

In some embodiments, decrypting the encrypted personal identification number further includes: decrypting, by the cryptocurrency securing system, the encrypted personal identification number via the first asymmetric key for deriving a sub-encrypted personal identification number; and decrypting, by the cryptocurrency securing system, the sub-encrypted personal identification number via the first one-time key for deriving the personal identification number.

In some embodiments, deriving the cryptocurrency private key information via the personal identification number of the first user device further includes: transmitting, by the cryptocurrency securing system, a second encrypted one-time key to a cloud server so that the cloud server is capable of decrypting the second encrypted one-time key via a third asymmetric key for deriving a second one-time key; receiving, by the cryptocurrency securing system, the second one-time key from the cloud server; and decrypting, by the cryptocurrency securing system, a first encrypted hash factor data via the second one-time key for deriving a hash factor data. Decrypting the encrypted personal key further includes: decrypting, by the cryptocurrency securing system, the encrypted personal key via the personal identification number and the hash factor data for deriving the personal key.

In some embodiments, decrypting the encrypted personal key further includes: hashing, by the cryptocurrency securing system, the personal identification number and the hash factor data for deriving a hash key; and decrypting, by the cryptocurrency securing system, the encrypted personal key via the hash key for deriving the personal key.

In some embodiments, deriving the cryptocurrency private key information via the personal identification number of the first user device further includes: generating, by the cryptocurrency securing device, a third one-time key; encrypting, by the cryptocurrency securing device, the hash factor data via the third one-time key for deriving a second encrypted hash factor data; and encrypting, by the cryptocurrency securing device, the third one-time key via a fourth asymmetric key for deriving a third encrypted one-time key, wherein the third asymmetric key is paired with the fourth asymmetric key.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A is a schematic view of a cryptocurrency securing system, in accordance with some embodiments of the present disclosure.

DETAILED DESCRIPTION

Figure 1A:
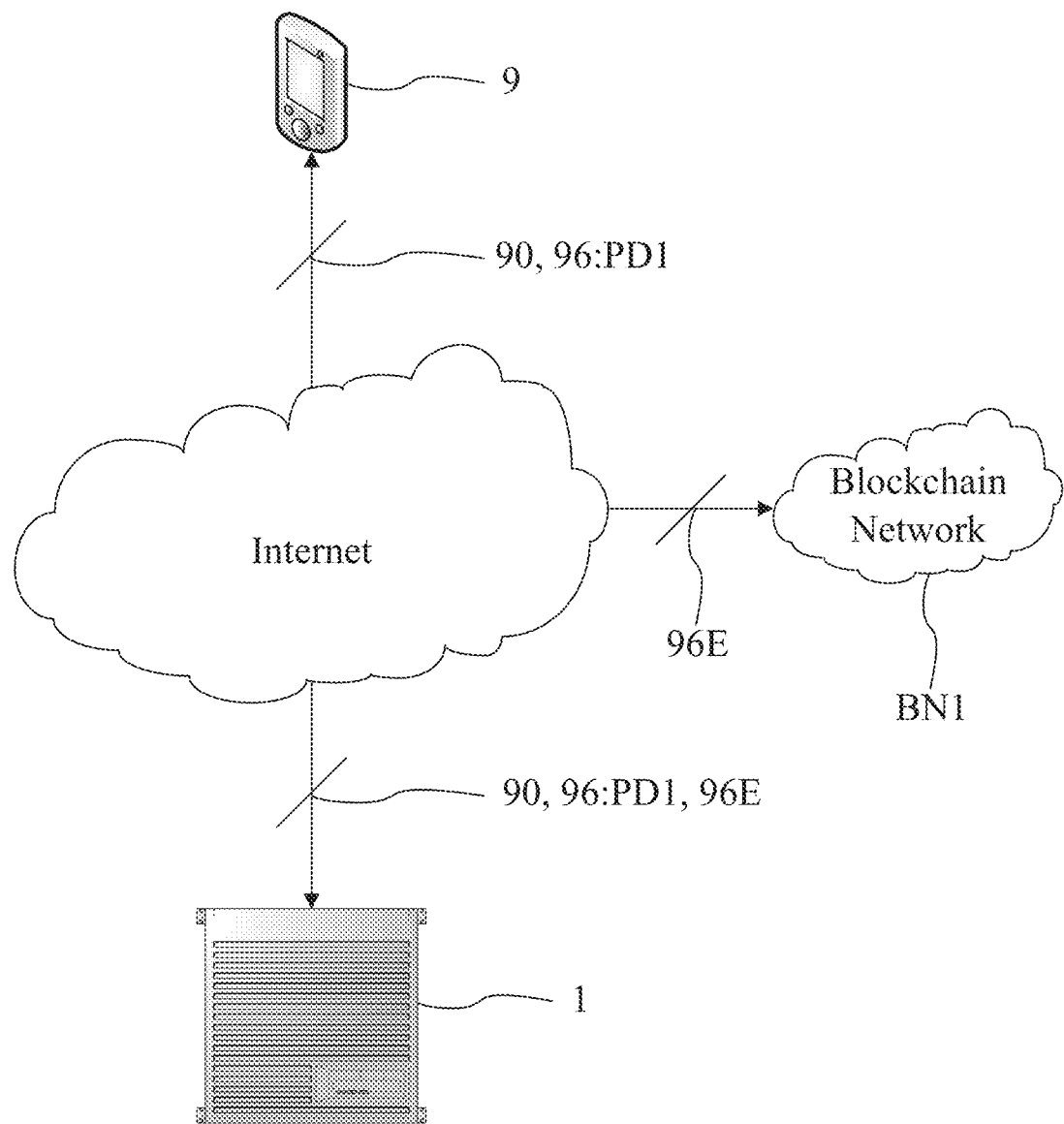
FIG. 1A is a schematic view of a cryptocurrency securing system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It shall be appreciated, however, that the present disclosure provides many applicable inventive concepts that can be embodied in a wide variety of specific contexts. The specific embodiments discussed are merely illustrative and do not limit the scope of the disclosure.

Figure 1B:
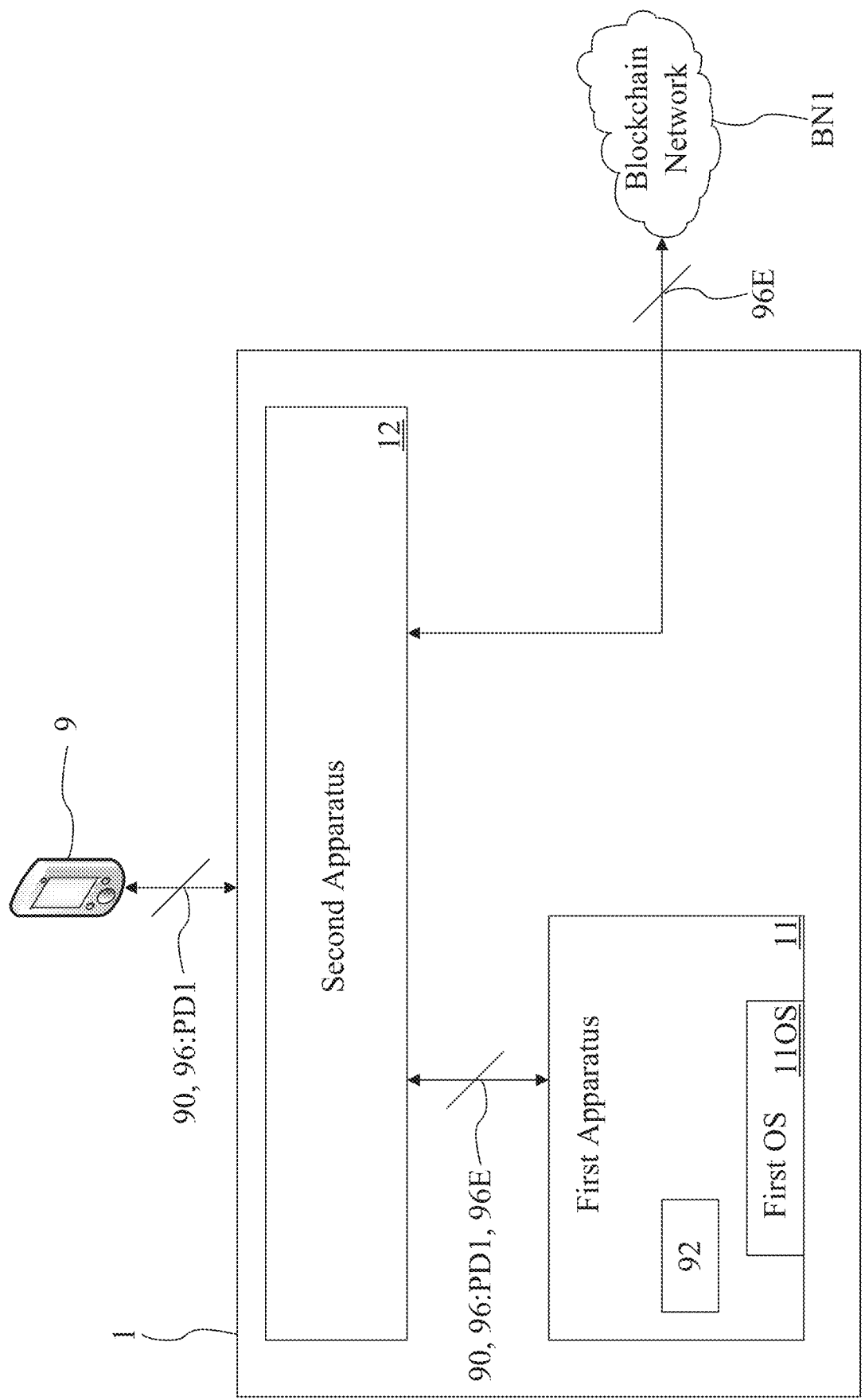
FIG. 1B is a block diagram of the cryptocurrency securing system, in accordance with some embodiments of the present disclosure.
Figure 1C:
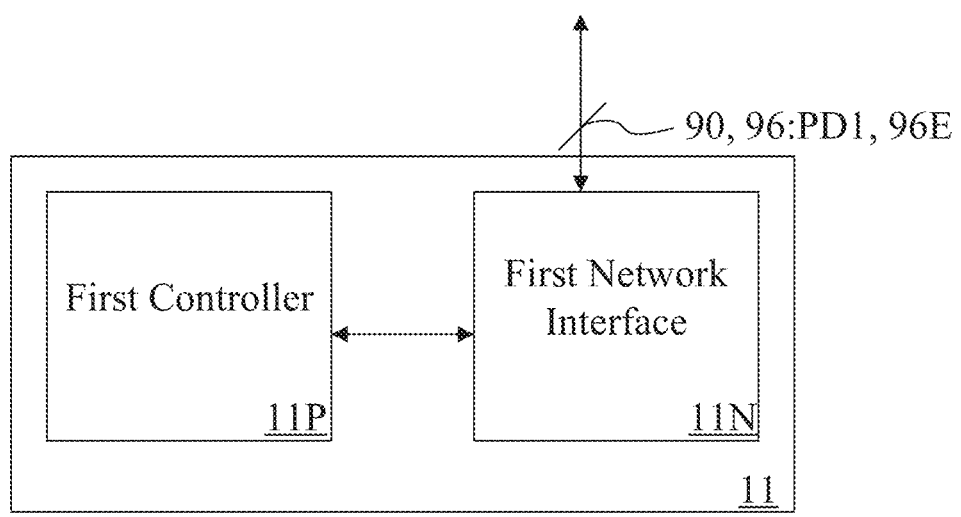
FIG. 1C is a block diagram of a first apparatus of the cryptocurrency securing system, in accordance with some embodiments of the present disclosure.

Please refer to FIG. 1A to FIG. 1C for some embodiments of the present disclosure. FIG. 1A is a schematic view of a cryptocurrency securing system 1 of some embodiments. The cryptocurrency securing system 1 connects with a first user device 9 and a blockchain network BN1 through Internet. FIG. 1B is a block diagram of the cryptocurrency securing system 1 of some embodiments. The cryptocurrency securing system 1 includes a first apparatus 11. FIG. 1C is a block diagram of the first apparatus 11 of some embodiments. The first apparatus 11 includes a first network interface 11N and a first controller 11P. It should be noted that the first controller 11P performs a first operating system 11OS for manipulating the first apparatus 11. The interactions between the elements will be further described hereinafter.

In some embodiments, the first user device 9 logs in to the cryptocurrency securing system 1 with a personal identification number 90. Next, when the first user device 9 needs to make a transaction by a cryptocurrency private key information 92 which is securely stored in the first apparatus 11, the first user device 9 transmits a cryptocurrency transaction information 96 to the first apparatus 11 through a second apparatus 12.

After receiving the cryptocurrency transaction information 96 from the first user device 9, the second apparatus 12 forwards the cryptocurrency transaction information 96 to the first apparatus 11. Then, after receiving the cryptocurrency transaction information 96, the first controller 11P of the first apparatus 11 performs the first operating system 11OS for determining whether a policy data PD1 corresponding to the cryptocurrency transaction information 96 is legal.

In detail, the cryptocurrency transaction information 96 of the first user device 9 may be transmitted with the policy data PD1 (e.g., maximum transaction amount per day, maximum number of transaction per day, whitelist cryptocurrency addresses, etc.) which is designated to the first user device 9. When the policy data PD1 corresponding to the cryptocurrency transaction information 96 is legal, the first controller 11P performs the first operating system 11OS for deriving the cryptocurrency private key information 92 via the personal identification number 90 of the first user device 9, and encrypting the cryptocurrency transaction information 96 via the cryptocurrency private key information 92 for deriving an encrypted cryptocurrency transaction information 96E. Next, the first controller 11P performs the first operating system 11OS for causing the first network interface 11N to transmit the encrypted cryptocurrency transaction information 96E to the blockchain network BN1 through the second apparatus 12.

On the other hand, when the policy data PD1 corresponding to the cryptocurrency transaction information 96 is not legal, it means that the cryptocurrency transaction information 96 from the first user device 9 may be suspicious. Accordingly, the cryptocurrency transaction information 96 is not further processed.

Figure 2B:
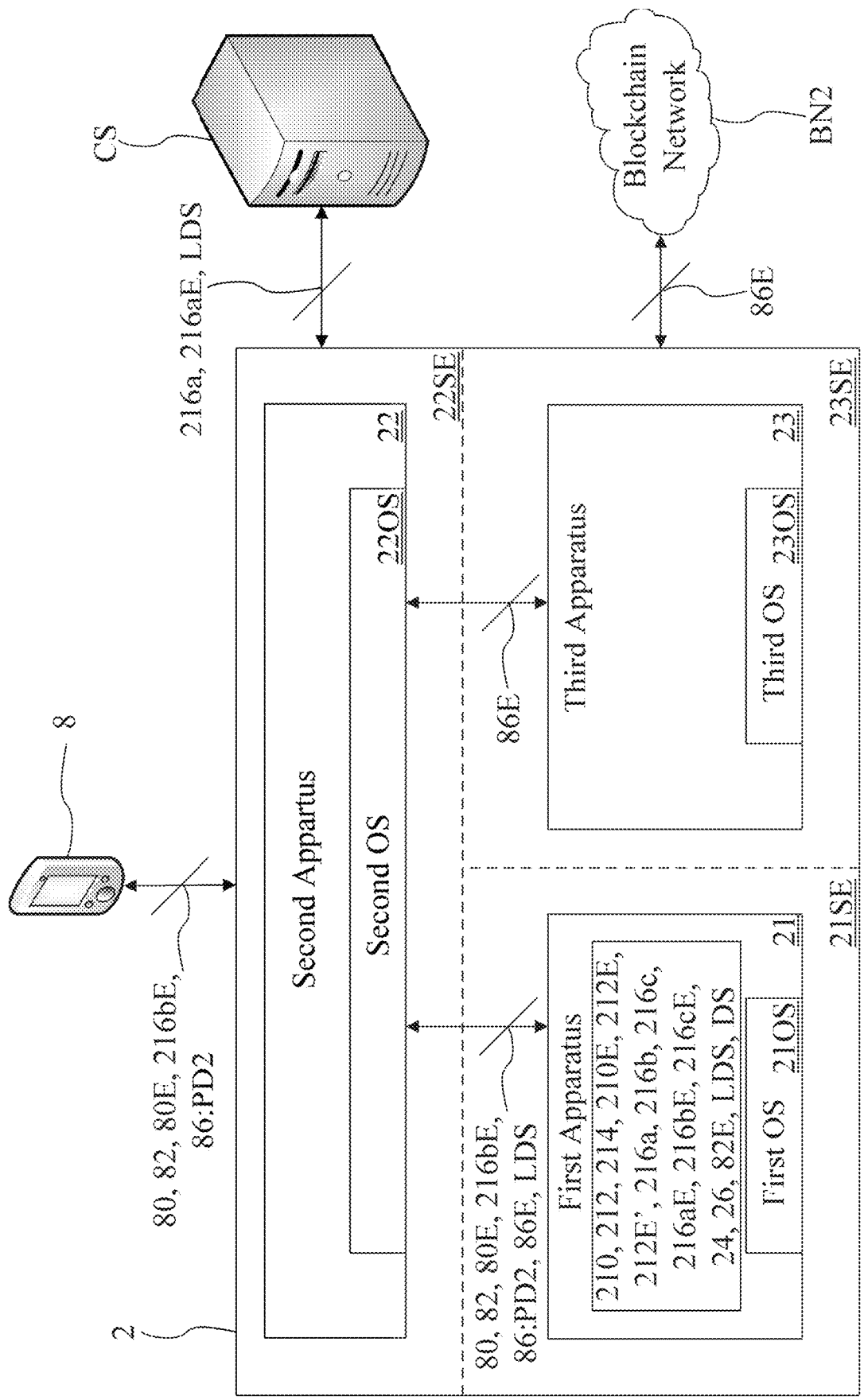
FIG. 2B is a block diagram of the cryptocurrency securing system, in accordance with some embodiments of the present disclosure.

Please refer to FIG. 2A to FIG. 2E for some embodiments of the present disclosure. FIG. 2A is a schematic view of a cryptocurrency securing system 2 of some embodiments. The cryptocurrency securing system 2 connects with a first user device 8, a cloud server CS and a blockchain network BN2 through Internet. FIG. 2B is a block diagram of the cryptocurrency securing system 2 of some embodiments. The cryptocurrency securing system 2 includes a first apparatus 21, a second apparatus 22 and a third apparatus 23.

Figure 2C:
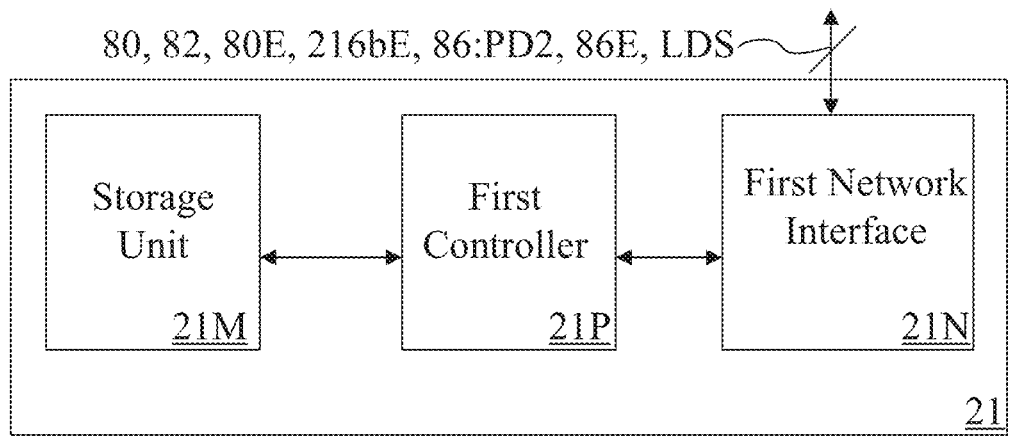
FIG. 2C is a block diagram of a first apparatus of the cryptocurrency securing system, in accordance with some embodiments of the present disclosure.
Figure 2D:
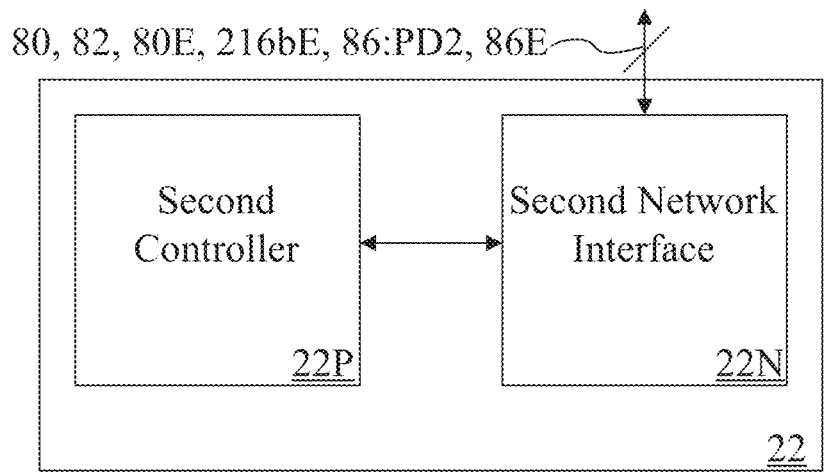
FIG. 2D is a block diagram of a second apparatus of the cryptocurrency securing system, in accordance with some embodiments of the present disclosure.
Figure 2E:
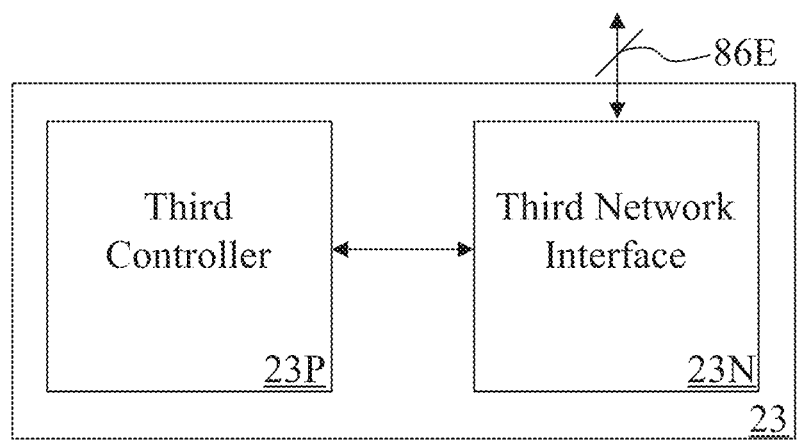
FIG. 2E is a block diagram of a third apparatus of the cryptocurrency securing system, in accordance with some embodiments of the present disclosure.

FIG. 2C is a block diagram of the first apparatus 21 of some embodiments. The first apparatus 21 includes a first network interface 21N, a first controller 21P and a storage unit 21M. FIG. 2D is a block diagram of the second apparatus 22 of some embodiments. The second apparatus 22 includes a second network interface 22N and a second controller 22P. FIG. 2E is a block diagram of the third apparatus 23 of some embodiments. The third apparatus 23 includes a third network interface 23N and a third controller 23P.

It should be noted that, in some embodiments, the first controller 21P of the first apparatus 21 performs a first operating system 21OS for manipulating the first apparatus 21 under a first network section 21SE, the second controller 22P of the second apparatus 22 performs a second operating system 22OS for manipulating the second apparatus 22 under a second network section 22SE, and the third controller 23P of the third apparatus 23 performs a third operating system 23OS for manipulating the third apparatus 23 under a third network section 23SE.

In some embodiments, the first network section 21SE, the second network section 22SE and the third network section 23SE are independent (i.e., the first apparatus 21, the second apparatus 22 and the third apparatus 23 are not under the same network section). In some embodiments, the first apparatus 21 under the first network section 21SE and the third apparatus 23 under the third network section 23SE may be configured as that the first apparatus 21 and the third apparatus 23 cannot directly exchange information with each other. In some embodiments, the first operating system 21OS, the second operating system 22OS and the third operating system 23OS may be compiled with different operating system kernel functions for different purposes. The interactions between the elements will be further described hereinafter.

Figure 2F:
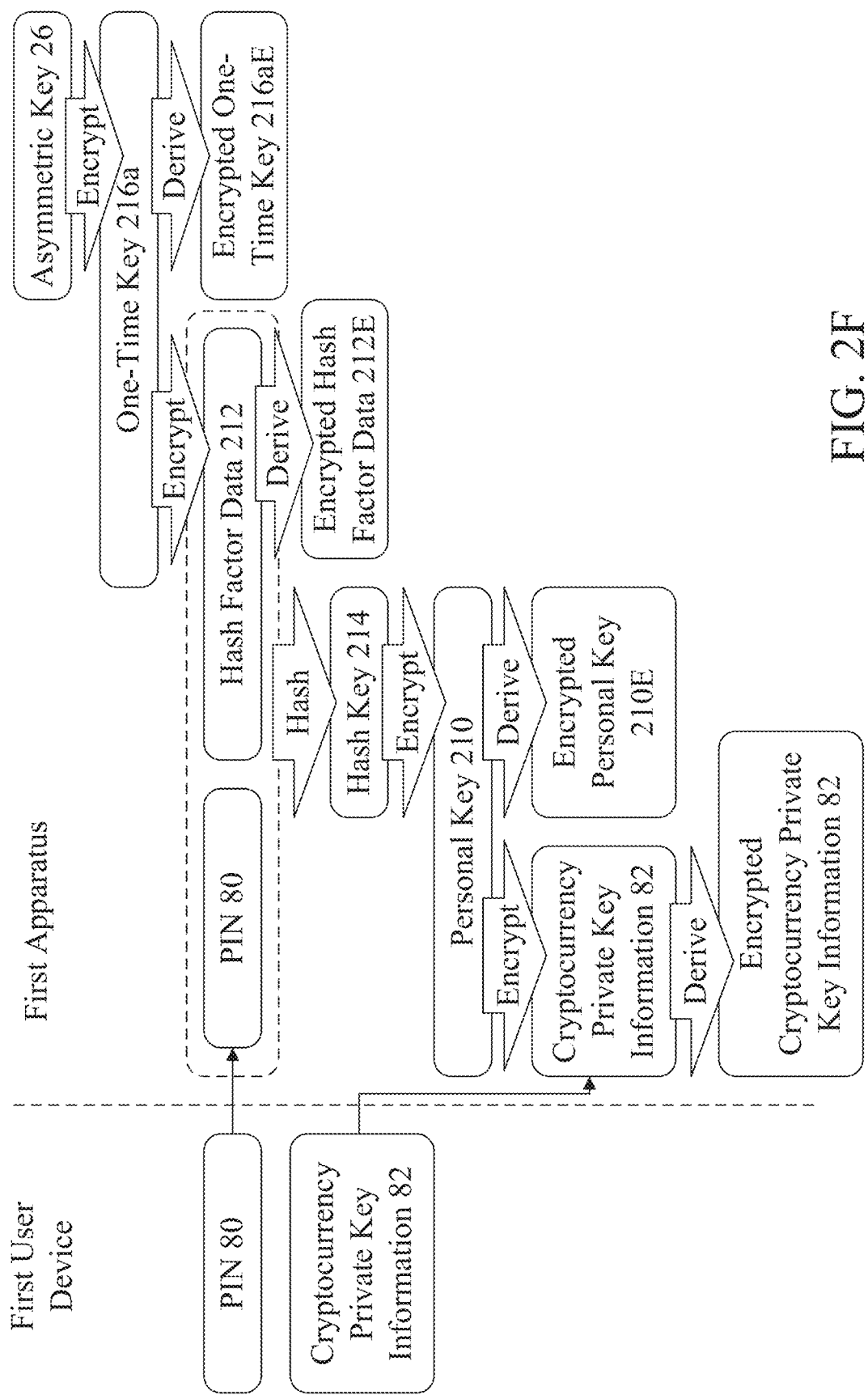
FIG. 2F is a schematic view of the operation of the initiation procedure of the cryptocurrency securing system, in accordance with some embodiments of the present disclosure.

In some embodiments, before the first user device 8 utilizes the cryptocurrency securing system 2, some security settings may be configured beforehand. In detail, for securing a cryptocurrency (i.e., a cryptocurrency private key) of a user (e.g., the owner of the cryptocurrency), an initiation procedure for encrypting the cryptocurrency private key is required. Please refer to FIG. 2F together, which is a schematic view of the operation of the initiation procedure of the cryptocurrency securing system 2 of some embodiments. First, the user uses the first user device 8 to legally log in to the cryptocurrency securing system 2 under a secured environment for reaching the first apparatus 21, and the first controller 21P of the first apparatus 21 performs the first operating system 21OS for causing the first network interface 21N to receive a personal identification number 80 and a cryptocurrency private key information 82 of the user from the first user device 8.

Next, the first controller 21P of the first apparatus 21 performs the first operating system 21OS for generating a personal key 210 and a hash factor data 212 corresponding to the personal identification number 80. More specifically, the personal key 210 and the hash factor data 212 are generated randomly and uniquely for the personal identification number 80. After generating the personal key 210 and the hash factor data 212, the personal key 210 and the cryptocurrency private key information 82 are encrypted.

In some embodiments, the first controller 21P of the first apparatus 21 performs the first operating system 21OS for encrypting the cryptocurrency private key information 82 via the personal key 210 for deriving an encrypted cryptocurrency private key information 82E. On the other hand, the personal key 210 is encrypted in a more robust procedure. In some embodiments, the first controller 21P of the first apparatus 21 performs the first operating system 21OS for hashing the personal identification number 80 with the hash factor data 212 for deriving a hash key 214, and then encrypting the personal key 210 via the hash key 214 for deriving an encrypted personal key 210E.

Moreover, in some embodiments, the hash factor data 212 is inserted in the personal identification number 80, and the personal identification number 80 with the hash factor data 212 is hashed by a first hash function for deriving the hash key 214. The personal key 210 is then encrypted via the hash key 214 for obtaining the encrypted personal key 210E.

In addition, in some embodiments, the hash factor data 212 is further encrypted for improving the security of the cryptocurrency securing system L. Specifically, the first controller 21P of the first apparatus 21 generate a one-time key 216a, and encrypts the hash factor data 212 via the one-time key 216a for deriving an encrypted hash factor data 212E.

Moreover, in some embodiments, in case the first apparatus 21 could be compromised, the cloud server CS is further introduced for enhancing the security. In detail, after utilizing the one-time key 216a, the first controller 21P of the first apparatus 21 performs the first operating system 21OS for encrypting the one-time key 216a via an asymmetric key 26 for deriving an encrypted one-time key 216aE. Therefore, the encrypted one-time key 216aE cannot be decrypted at the end of the first apparatus 21 since the key used to encrypt the one-time key 216a is an asymmetric key, but the encrypted one-time key 216aE can be only decrypted at the end of the cloud server CS who has an asymmetric key 70 paired with the asymmetric key 26. Accordingly, the storage unit 21M stores the encrypted cryptocurrency private key information 82E, the encrypted personal key 210E, the encrypted hash factor data 212E and the encrypted one-time key 216aE respectively for later use.

In addition, a legal policy data (not shown) designated to the first user device 8 may be determined by a legal operator first, and the cloud server CS generates a legal digital signature LDS by hashing the legal policy data with a second hash function. Then, the first controller 21P of the first apparatus 21 performs the first operating system 21OS for causing the first network interface 21N to receive the legal digital signature LDS from the cloud server CS, and storing the legal digital signature LDS in the storage unit 21M for later use.

In some embodiments, the legal digital signature LDS may be transmitted from the cloud server CS to the first apparatus 21 directly. In some embodiments, the legal digital signature LDS may be transmitted from the cloud server CS to the second apparatus 22 first, and then the second apparatus 22 forwards the legal digital signature LDS to the first apparatus 21. After the mentioned encrypting and the storing operations, the security settings are completed.

Figure 2G:
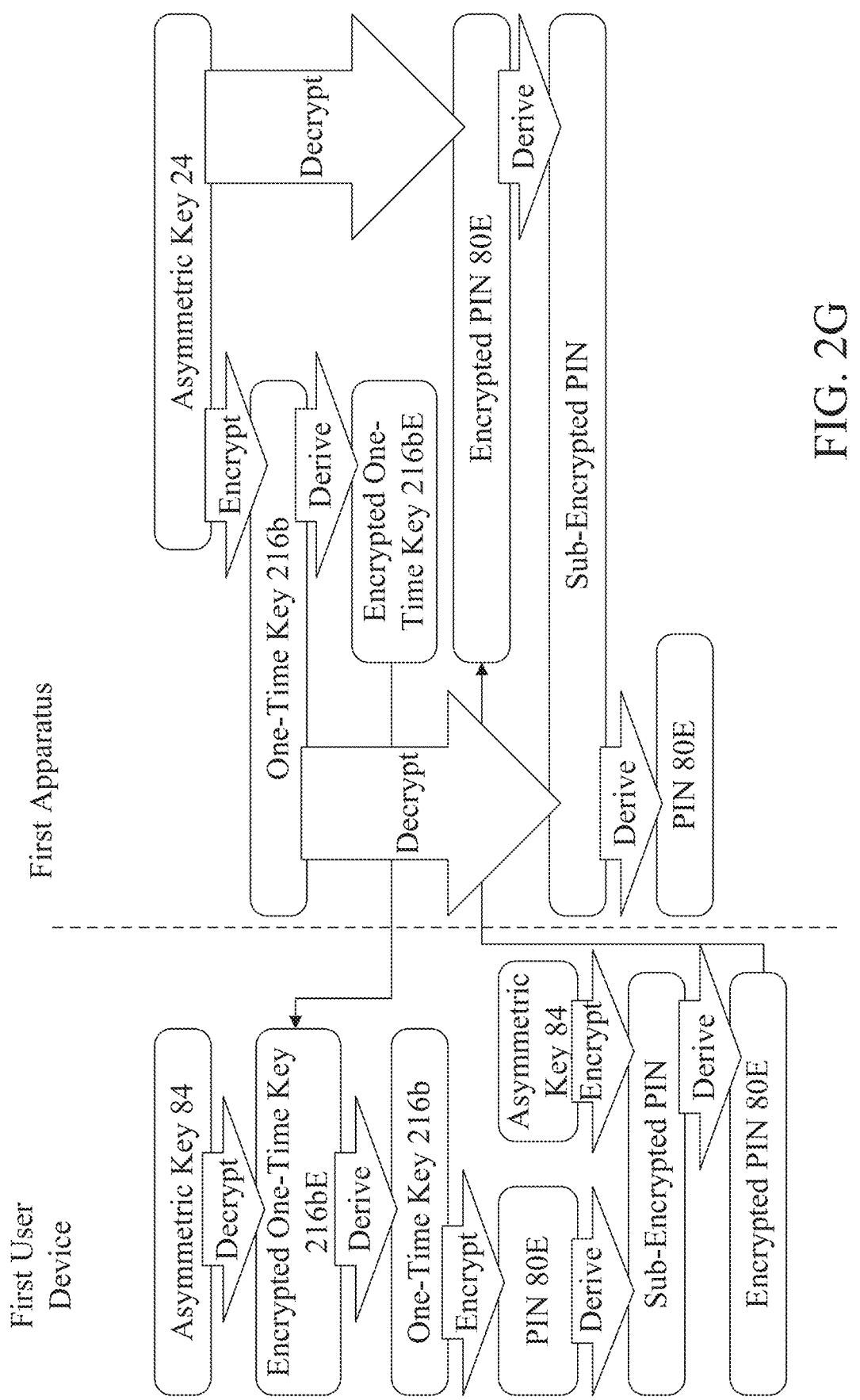
FIGS. 2G to 2H are schematic views of the operation of the utilization procedure of the cryptocurrency securing system, in accordance with some embodiments of the present disclosure.

Afterwards, when the user (e.g., the owner of the cryptocurrency or an operator who may be authorized to use the cryptocurrency) needs the cryptocurrency private key information 82 for transaction, the user uses the first user device 8 to log in to the cryptocurrency securing system 2. Please refer to FIG. 2G together, which is schematic view of the operation of the utilization procedure of the cryptocurrency securing system 2 of some embodiments. In detail, when the first user device 8 logs in to the cryptocurrency securing system 2, the first controller 21P of the first apparatus 21 performs the first operating system 21OS for generating an one-time key 216b, and encrypts the one-time key 216b via an asymmetric key 24 stored in the storage unit 21M for deriving an encrypted one-time key 216bE. Then, the first controller 21P of the first apparatus 21 performs the first operating system 21OS for causing the first network interface 21N to transmit the encrypted one-time key 216bE to the first user device 8 through the second apparatus 22.

Subsequently, the first user device 8 decrypts the encrypted one-time key 216bE via an asymmetric key 84 paired with the asymmetric key 24 for deriving the one-time key 216b, and encrypts the personal identification number 80 via the one-time key 216b and the asymmetric key 84 for deriving an encrypted personal identification number 80E.

More particularly, after deriving the one-time key 216b, the first user device 8 encrypts the personal identification number 80 via the one-time key 216b for deriving a sub-encrypted personal identification number (not shown), and then encrypts the sub-encrypted personal identification number via the asymmetric key 84 for deriving the encrypted personal identification number 80E. Next, the first user device 8 transmits the encrypted personal identification number 80E to the first apparatus 21 through the second apparatus 22.

On the other hand, the first controller 21P of the first apparatus 21 performs the first operating system 21OS for causing the first network interface 21N to receive the encrypted personal identification number 80E. Then the first controller 21P of the first apparatus 21 performs the first operating system 21OS for decrypting the encrypted personal identification number 80E via the asymmetric key 24 for deriving the sub-encrypted personal identification number, and decrypting the sub-encrypted personal identification number via the one-time key 216b for deriving the personal identification number 80.

Accordingly, the first controller 21P of the first apparatus 21 performs the first operating system 21OS for determining whether the personal identification number 80 corresponds to the first user device 8. In some embodiments, when it is determined that the personal identification 80 corresponds to the first user device 8, a transaction may be further processed.

In some embodiments, after determining that the personal identification 80 corresponds to the first user device 8, the first controller 21P of the first apparatus 21 performs the first operating system 21OS for causing the first network interface 21N to notify the cloud server CS of receiving the personal identification number 80. Then the cloud server CS may further determine whether the first user device 8 is legal (i.e., whether the first user device 8 is compromised) via receiving authentication information from the first user device 8.

In particular, when the cloud server CS is notified of that the first apparatus 21 receives the personal identification number 80 of the first user device 8, the cloud server CS transmits a confirmation message (e.g., Short Message Service message), which contains a verification code, to the first user device 8 through cell phone network. Then, the first user device 8 may be determined legal by the cloud server CS when the first user device 8 transmits the authentication information, which contains the verification code, back to the cloud server CS. Next, the cloud server CS transmits a response to the first apparatus 21 for informing the first apparatus 21 of that the first user device 8 is legal. In other words, the first controller 21P of the first apparatus 21 performs the first operating system 21OS for causing the first network interface 21N to receive the response from the cloud server CS for being informed that the first user device 8 is legal.

Next, when the first user device 8 needs to make a transaction by the cryptocurrency private key information 82 which is securely stored in the first apparatus 21, the first user device 8 transmits a cryptocurrency transaction information 86 to the second apparatus 22 first. The second controller 22P of the second apparatus 22 performs the second operating system 22OS for causing the second network interface 22N to receive the cryptocurrency transaction information 86 from the first user device 8 and to transmit the cryptocurrency transaction information 86 to the first apparatus 21. Then, after receiving the cryptocurrency transaction information 86, the first controller 21P performs the first operating system 21OS for determining whether a policy data PD2 corresponding to the cryptocurrency transaction information 86 is legal.

In detail, the cryptocurrency transaction information 86 of the first user device 8 may be transmitted with the policy data PD2 (e.g., maximum transaction amount per day, maximum number of transaction per day, whitelist cryptocurrency addresses, etc.) which is designated to the first user device 8. In some embodiments, the first controller 21P performs the first operating system 21OS for hashing the policy data PD2 by the second hash function for deriving a digital signature DS, and determining whether the digital signature DS of the policy data PD2 matches the legal digital signature LDS. The policy data. PD2 corresponding to the cryptocurrency transaction information 86 is legal when the digital signature DS of the policy data PD2 matches the legal digital signature LDS.

Accordingly, after the policy data PD2 corresponding to the cryptocurrency transaction information 86 is determined legal, the first controller 21P of the first apparatus 21 performs the first operating system 21OS for deriving the cryptocurrency private key information 82 via the personal identification number 80 of the first user device 8.

Figure 2H:
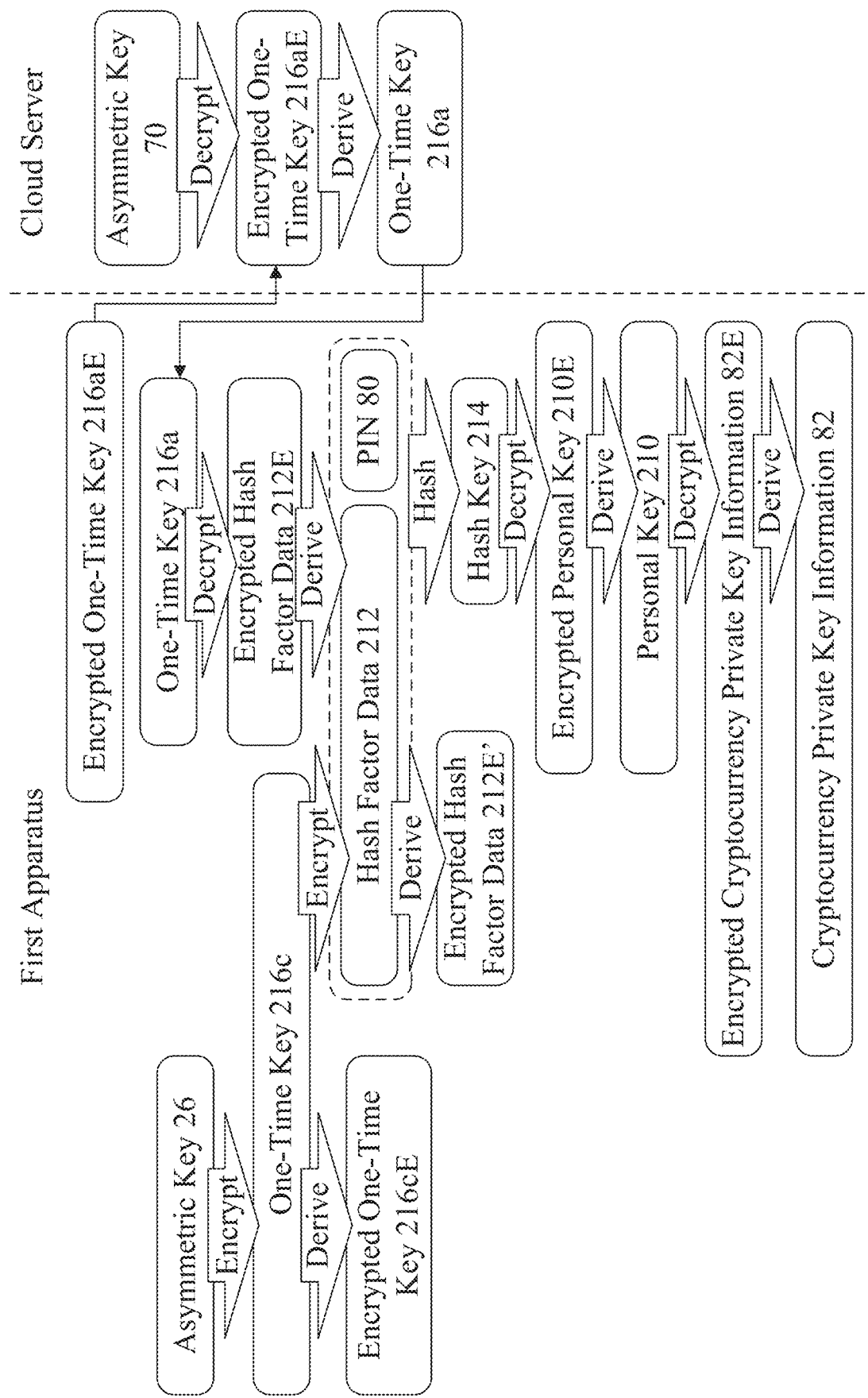

Please refer to FIG. 2H together, which is schematic view of the operation of the utilization procedure of the cryptocurrency securing system 2 of some embodiments. In detail, a corresponding hash factor data is needed for further decryption. Particularly, since the encrypted hash factor data 212E can be only decrypted via the one-time key 216a, the one-time key 216a must be obtained first. Because the storage unit 21M of the first apparatus 21 only stores the encrypted one-time key 216aE while the encrypted one-time key 216aE can be only decrypted at the end of the cloud server CS, the first controller 21P of the first apparatus 21 performs the first operating system 21OS for causing the first network interface 21N to transmit the encrypted one-time key 216aE to the cloud server CS.

Afterwards, the cloud server CS decrypts the encrypted one-time key 216aE via the asymmetric key 70 for deriving the one-time key 216a, and transmits the one-time key 216a back to the first apparatus 21. On the other hand, the first controller 21P of the first apparatus 21 performs the first operating system 21OS for causing the first network interface 21N to receive the one-time key 216a from the cloud server CS, and then the first controller 21P performs the first operating system 21OS for decrypting the encrypted hash factor data 212E via the one-time key 216a for deriving the hash factor data 212.

After deriving the hash factor data 212, the first controller 21P of the first apparatus 21 performs the first operating system 21OS for decrypting the encrypted personal key 210E via the personal identification number 80 and the hash factor data 211 for deriving the personal key 210. Specifically, the first controller 21P of the first apparatus 21 performs the first operating system 21OS for hashing the personal identification number 80 with the hash factor data 212 for deriving the hash key 214, and decrypting the encrypted personal key 210E via the hash key 214 for deriving the personal key 210.

For more details, in some embodiments, the hash factor data 212 is inserted in the personal identification number 80, and the personal identification number 80 with the hash factor data 212 is hashed by the first hash function for deriving the hash key 214. Then the encrypted personal key 210E is decrypted via the hash key 214 for obtaining the personal key 210. After obtaining the personal key 210, the first controller 21P of the first apparatus 21 performs the first operating system 21OS for decrypting the encrypted cryptocurrency private key information 82E via the personal key 210 for deriving the cryptocurrency private key information 82. Therefore, the cryptocurrency private key information 82 can be used for transaction.

In addition, after being utilized, the hash factor data 212 is further encrypted. Particularly, the first controller 21P of the first apparatus 21 performs the first operating system 21OS for generating a one-time key 216c, and encrypting the hash factor data 212 via the one-time key 216c for deriving an encrypted hash factor data 212E'. Then the first controller 21P of the first apparatus 21 performs the first operating system 2105 for encrypting the one-time key 216c via the asymmetric key 26 for deriving an encrypted one-time key 216cE. The storage unit 21M stores the encrypted one-time key 216cE. Therefore, the encrypted one-time key 216cE is kept safely at the end of the first apparatus 21 since the encrypted one-time key 216cE can only be decrypted by the cloud server CS who has the asymmetric key 70.

It shall be further emphasized that, in some embodiments, the cryptocurrency private key information 82 includes at least one cryptocurrency private key (not shown) corresponding to at least one cryptocurrency on the blockchain. More, the cryptocurrency private key information 82 can further include a mnemonic word data (not shown) of the at least one cryptocurrency private key. In detail, the mnemonic word data is the combination of words generated by inputting the at least one cryptocurrency private key into a converting function (e.g., Bitcoin Improvement Proposals 39, BIP-39).

Similarly, in some embodiments, each user has his/her own unique identification recorded in the first apparatus 21, and the related information (such as the asymmetric key 24, the asymmetric key 26, the encrypted one-time key 216aE, the encrypted hash factor data 212E, the encrypted personal key 210E, the encrypted cryptocurrency private key information 82E) shall be generated, retrieved or utilized based on the unique identification while the user logs in to the cryptocurrency system 2. The application of the unique identifications for different users to utilize related information shall be appreciated by those who skilled in the art depending on the above disclosure, and thus will not be further described herein.

Accordingly, the first controller 21P of the first apparatus 21 performs the first operating system 21OS for encrypting the cryptocurrency transaction information 86 via the cryptocurrency private key information 82 for deriving an encrypted cryptocurrency transaction information 86E. Next, the first controller 21P performs the first operating system 21OS for causing the first network interface 21N to transmit the encrypted cryptocurrency transaction information 86E to the second apparatus 22.

Figure 2I:
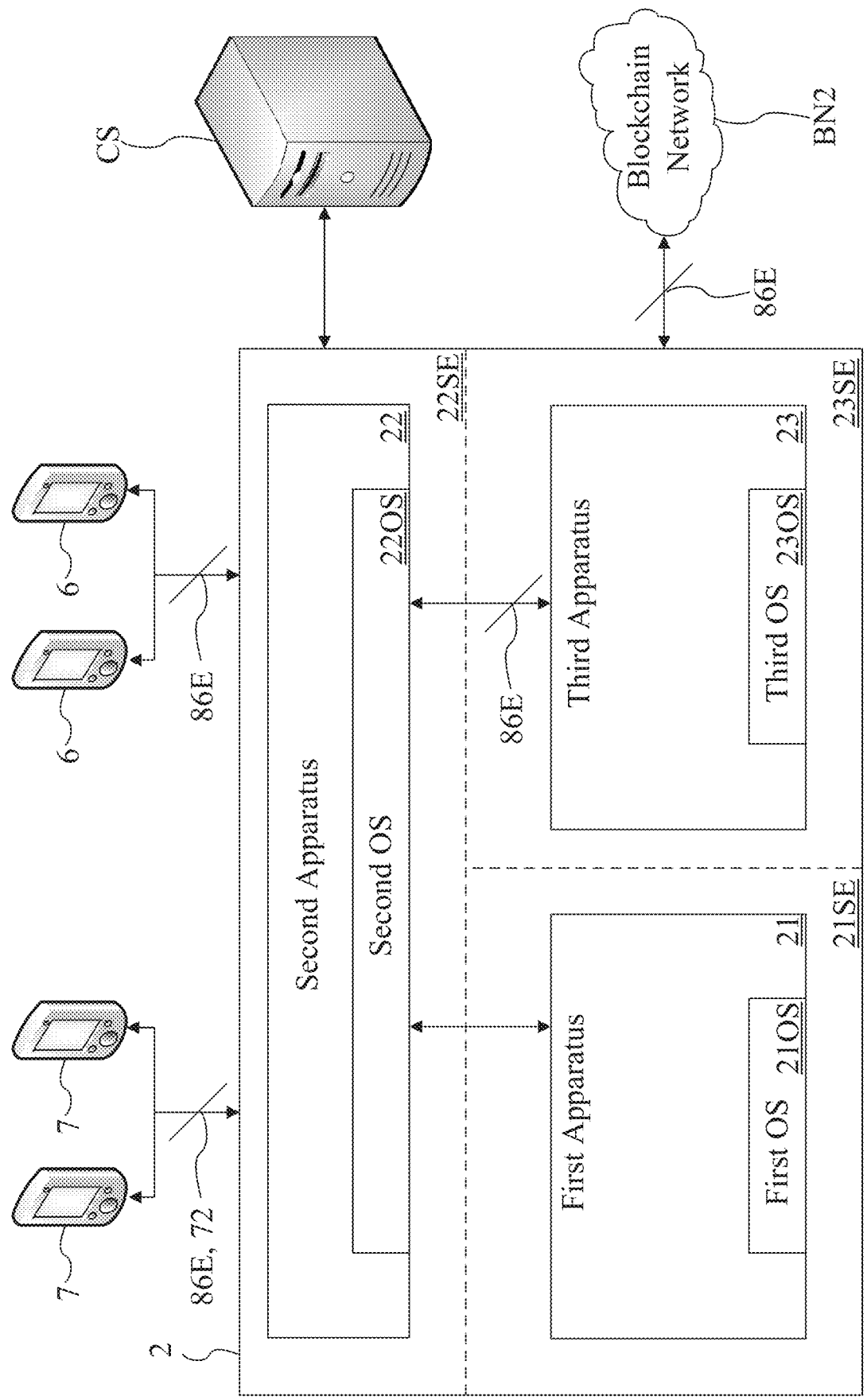
FIG. 2I is a schematic view of the cryptocurrency securing system, in accordance with some embodiments of the present disclosure.

In some embodiments, at least one second user device 7 may be introduced as approver for approving the encrypted cryptocurrency transaction information 86E. Please refer to FIG. 2I together, which is a schematic view of the cryptocurrency securing system 2 of some embodiments. In detail, after obtaining the encrypted cryptocurrency transaction information 86E, the second controller 22P of the second apparatus 22 performs the second operating system 22OS for causing the second network interface 22N to notify the at least one second user device 7 of the encrypted cryptocurrency transaction information 86E.

When the at least one second user device 7 confirms that the transaction of the encrypted cryptocurrency transaction information 86E should be approve, the at least one second user device 7 transmits back at least one approval information 72 to the second apparatus 22. However, when the at least one second user device 7 confirms that the transaction of the encrypted cryptocurrency transaction information 86E should not be approve, the at least one second user device 7 does not transmit back any approval information to the second apparatus 22.

Then, the second controller 22P of the second apparatus 22 performs the second operating system 22OS for causing the second network interface 22N to receive the at least one approval information 72 from the at least one second user device 7. Accordingly, the second controller 22P further performs the second operating system 22OS for causing the second network interface 22N to transmit the encrypted cryptocurrency transaction information 86E to the third apparatus 23 based on the at least one approval information 72. The third controller 23P of the third apparatus 23 performs the third operating system 23OS for causing the third network interface 23N to receive the encrypted cryptocurrency transaction information 86E from the second apparatus 22, and to broadcast the encrypted cryptocurrency transaction information 86E to the blockchain network BN2 for fulfilling the blockchain transaction.

In some embodiments, at least one third user device 6 may be introduced as auditor for monitoring the transaction of the encrypted cryptocurrency transaction information 86E. In detail, after broadcasting the encrypted cryptocurrency transaction information 86E to the blockchain network BN2, the second controller 22P of the second apparatus 22 performs the second operating system 22OS for causing the second network interface 22N to notify the at least one third user device 6 of broadcasting the encrypted cryptocurrency transaction information 86E to the blockchain network BN2.

It shall be particularly appreciated that, in some embodiments, the apparatuses mentioned in the above embodiments may be physical equipment. In detail, the controllers mentioned in the above embodiments may be physical central processing units (CPUs), other hardware circuit elements capable of executing relevant instructions, or combination of computing circuits that shall be well-appreciated by those skilled in the art based on the above disclosures. Moreover, the storage unit mentioned in the above embodiments may be non-volatile storages (e.g., hard driver disk or solid-state drive) for storing data. Further, the network interface may be physical transceiver, or other transmission and reception circuits used for transmitting and receiving data. Further, the controller, the network interface and the storage unit in the same apparatus may be electrically connected (e.g., electrically connected via bus).

In some embodiments, the apparatuses mentioned in the above embodiments may be virtual machines. In detail, the controllers mentioned in the above embodiments may be virtual processors configured for the virtual machines, and the storage unit mentioned in the above embodiments may be virtual storage space configured for the virtual machines. Similarly, the network interfaces mentioned in the above embodiments may be virtual network interfaces configured for the virtual machines. In particular, the virtual machines may be implemented on at least one physical server which has at least one physical processor, at least one physical transceiver and at least one non-volatile storage. However, it is not intended to limit the implementation embodiments of the present disclosure.

Furthermore, the encryptions/decryptions described in the above embodiments can be achieved via Advanced Encryption Standard (e.g., AES-256) or RSA (e.g., RSA-4096 for asymmetric keys) while AES is used for symmetric encryptions/decryption (e.g., encryption/decryption of personal identification numbers, one-time keys, personal keys, hash keys) and RSA is used for asymmetric encryptions/decryption (e.g., encryption/decryption of asymmetric keys). Further, the hash function described in the above embodiments can be achieved via Secure Hash Algorithm (e.g., SHA-256). Flow to encrypt/decrypt/hash data based on AES/RSA/SHA algorithms shall be appreciated by those skilled in the art based on the above disclosure, and thus will not be further described herein.

In addition, each of the one-time keys described in the above embodiments is an event-based (e.g., one-time keys 216a, 216c)/time-based (e.g., one-time key 216b) one-time key and can be used once only. More specifically, as for event-based/time-based one-time keys, after being used for decrypting messages, these keys become useless. Further, the time-based one-time keys become useless as well after a designated time interval. How to use one-time key for encryption/decryption shall be appreciated by those skilled in the art based on the above disclosure, and thus will not be further described herein.

Figure 3:
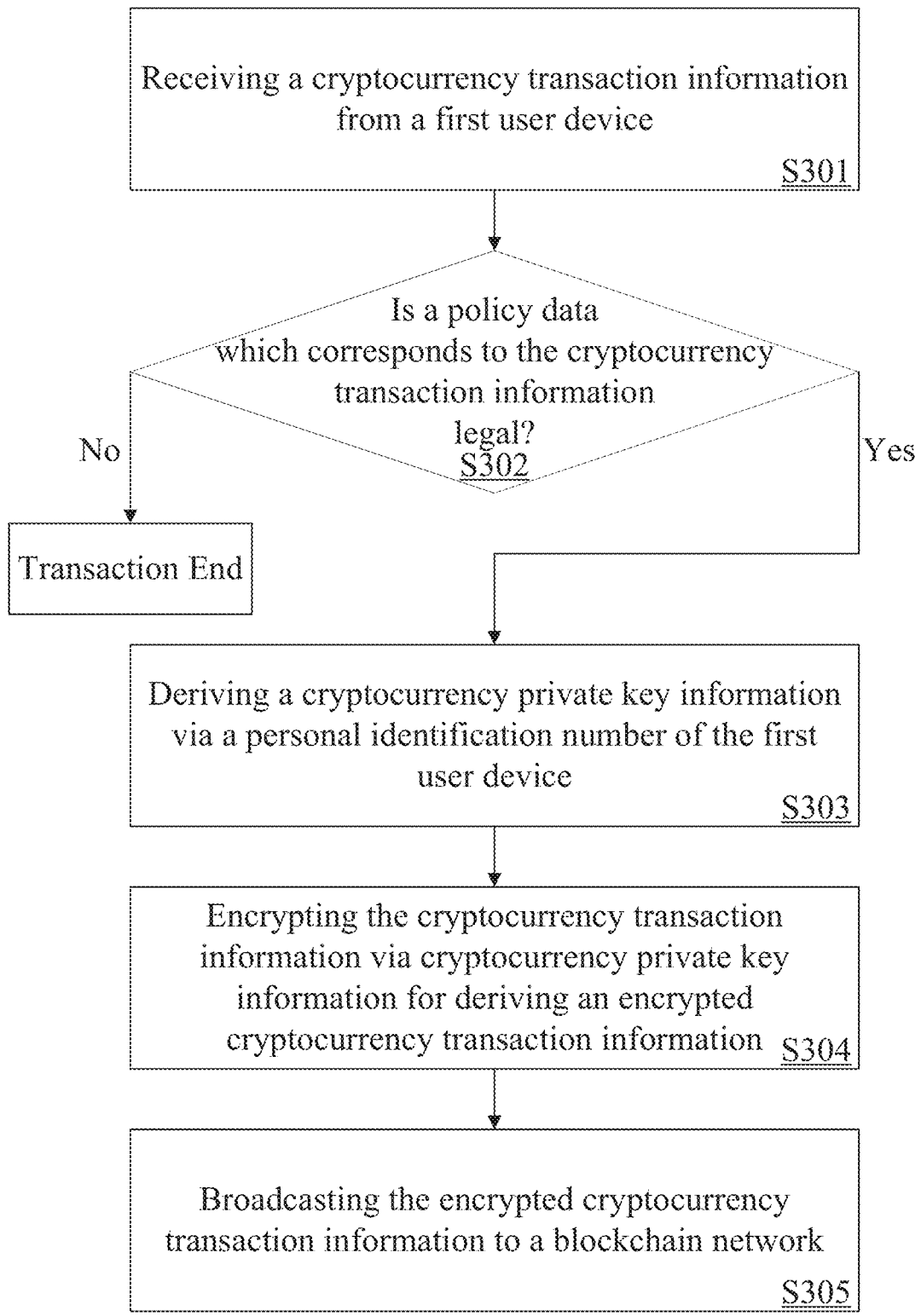
FIG. 3 is a flowchart diagram, in accordance with some embodiments of the present disclosure.
Figure 4A:
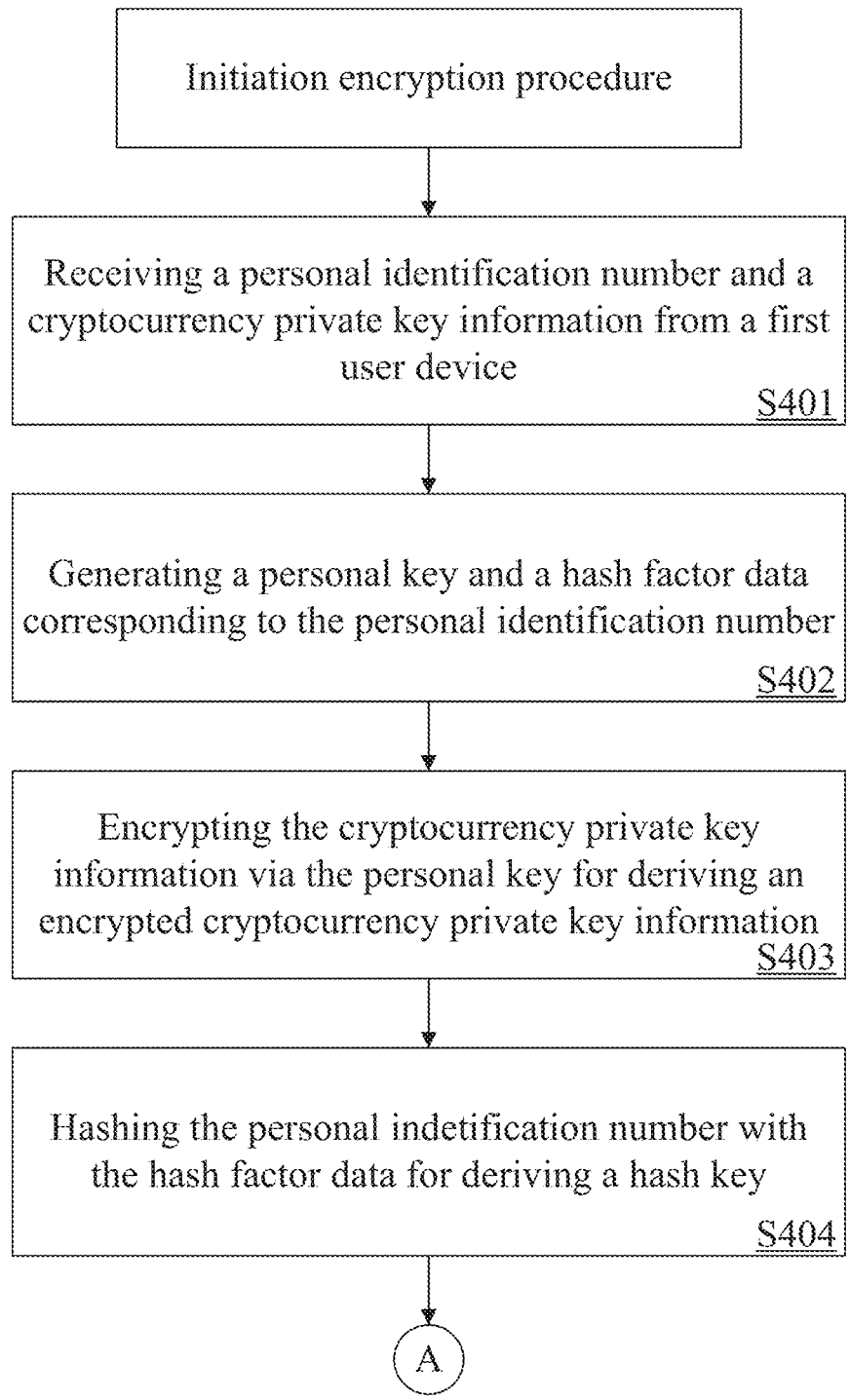
FIGS. 4A to 4I are flowchart diagrams, in accordance with some embodiments of the present disclosure.
Figure 4B:
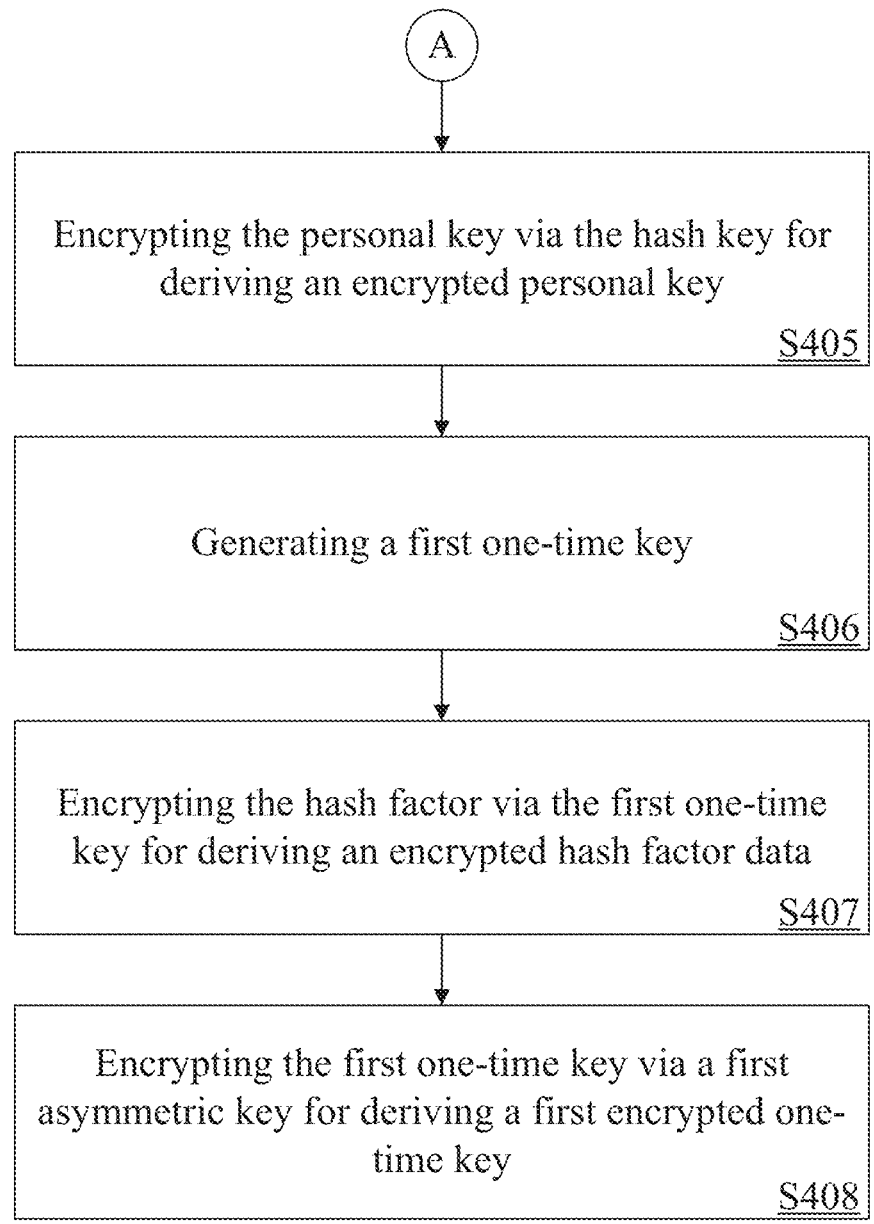
Figure 4C:
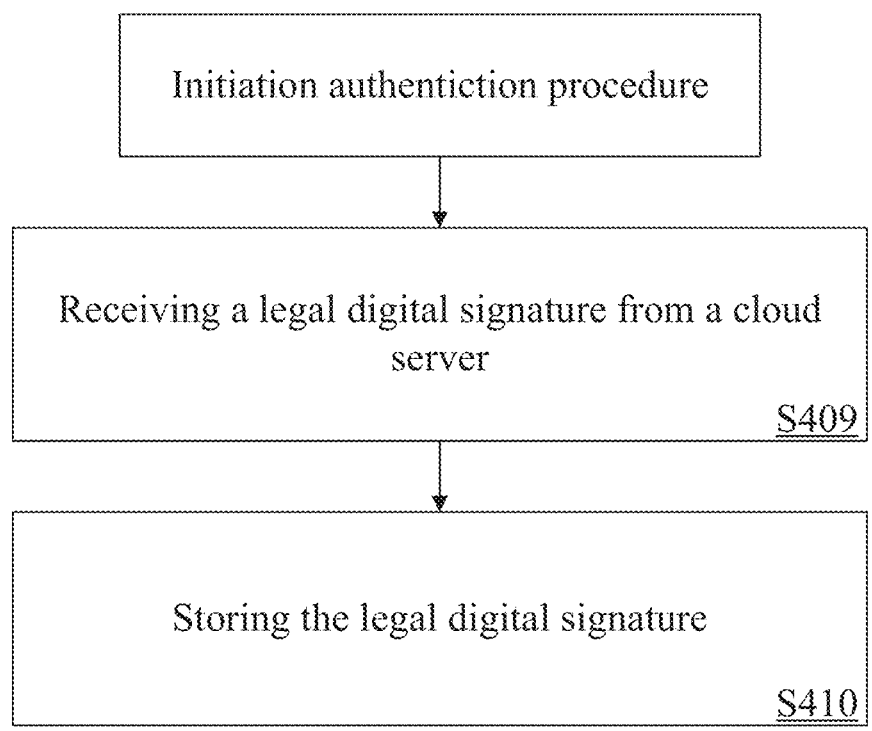
Figure 4D:
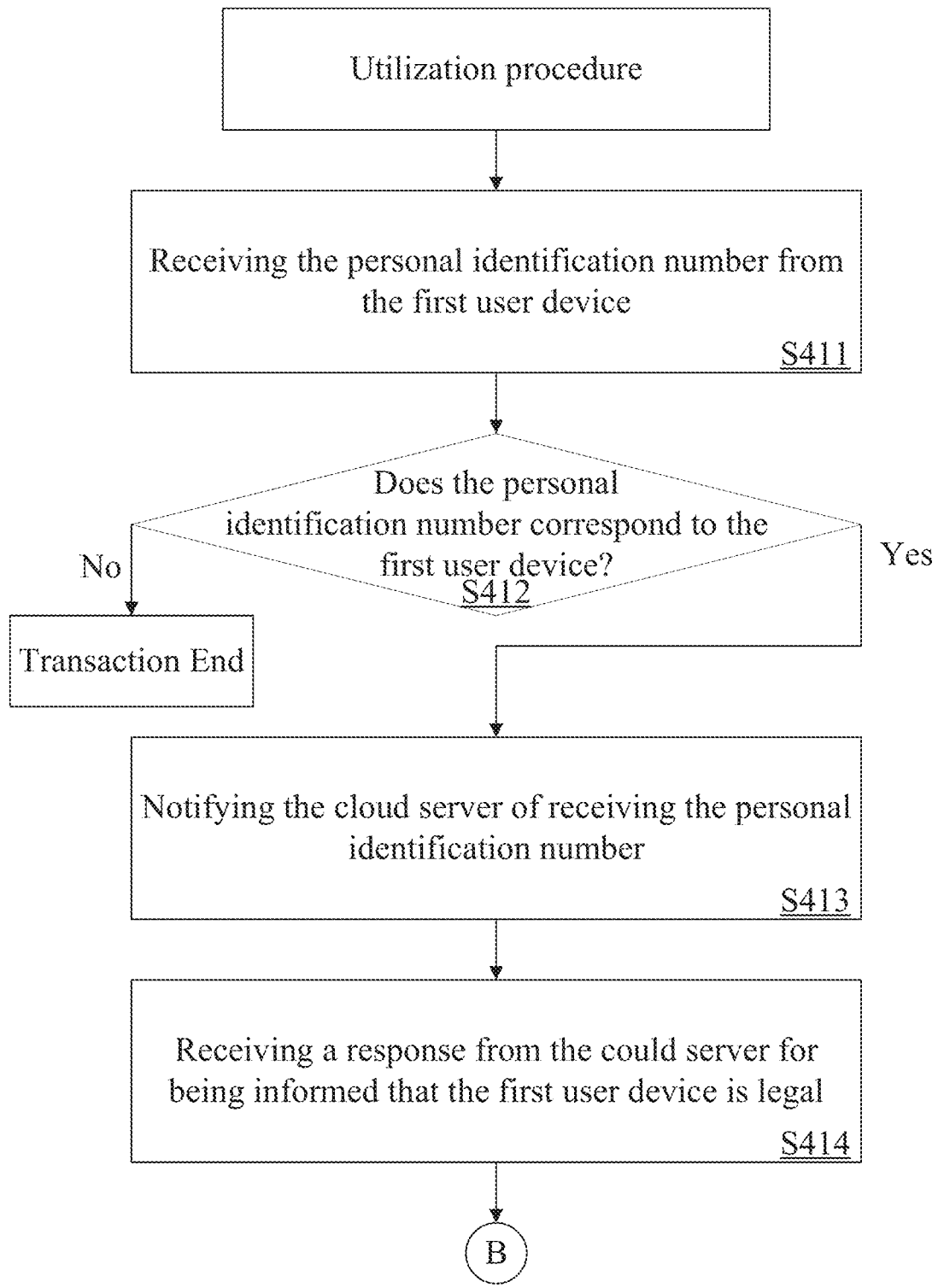
Figure 4E:
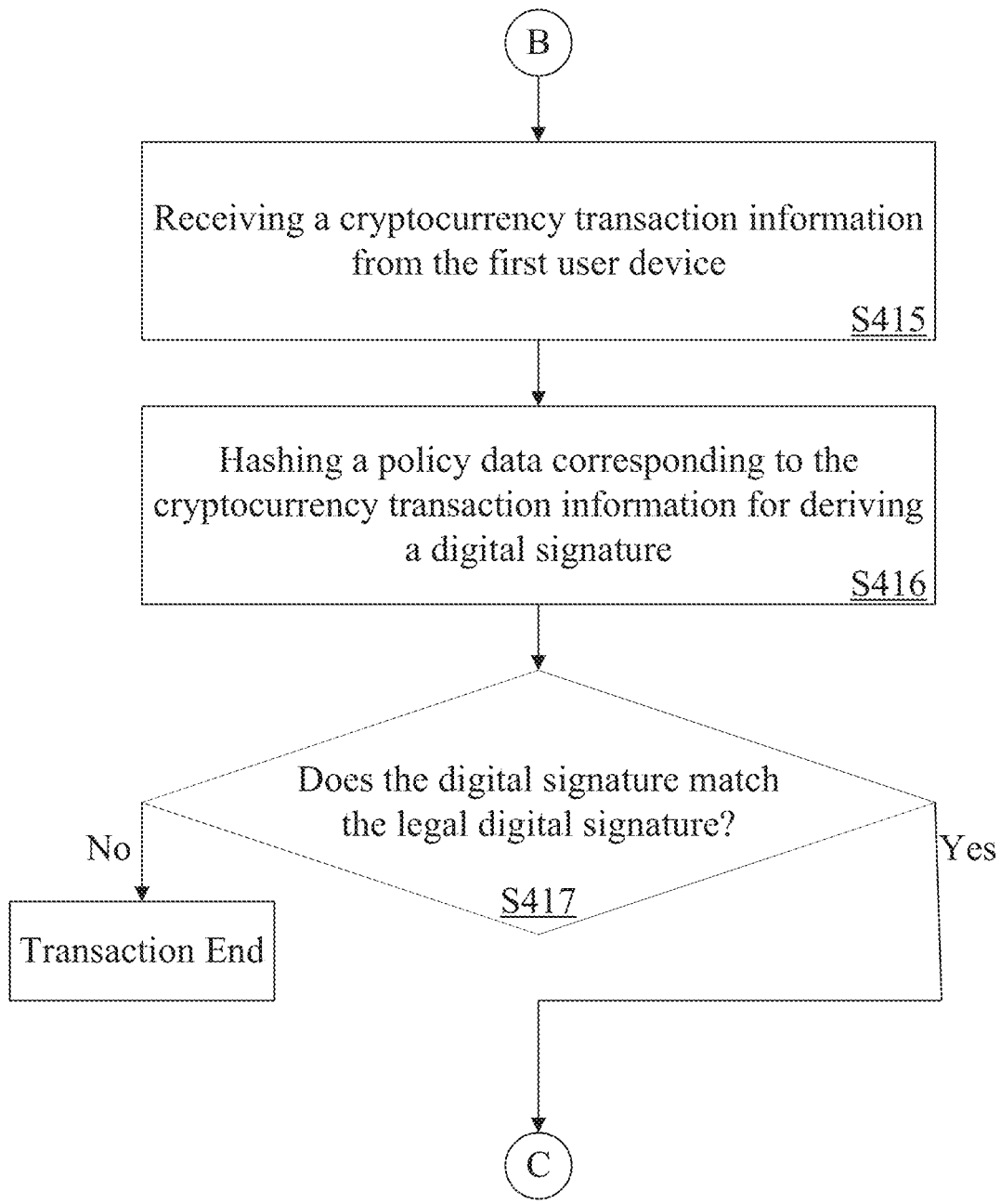
Figure 4F:
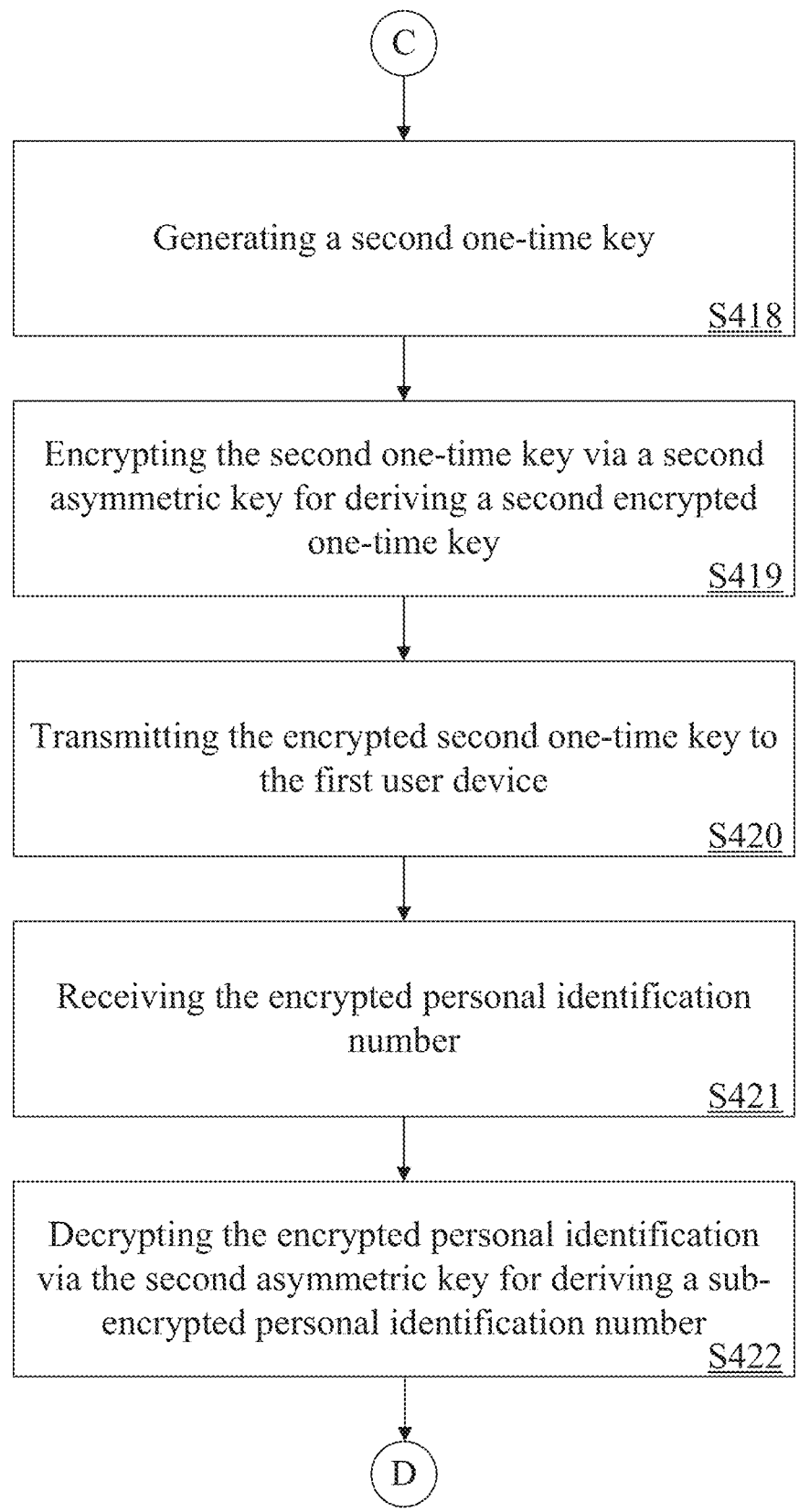
Figure 4G:
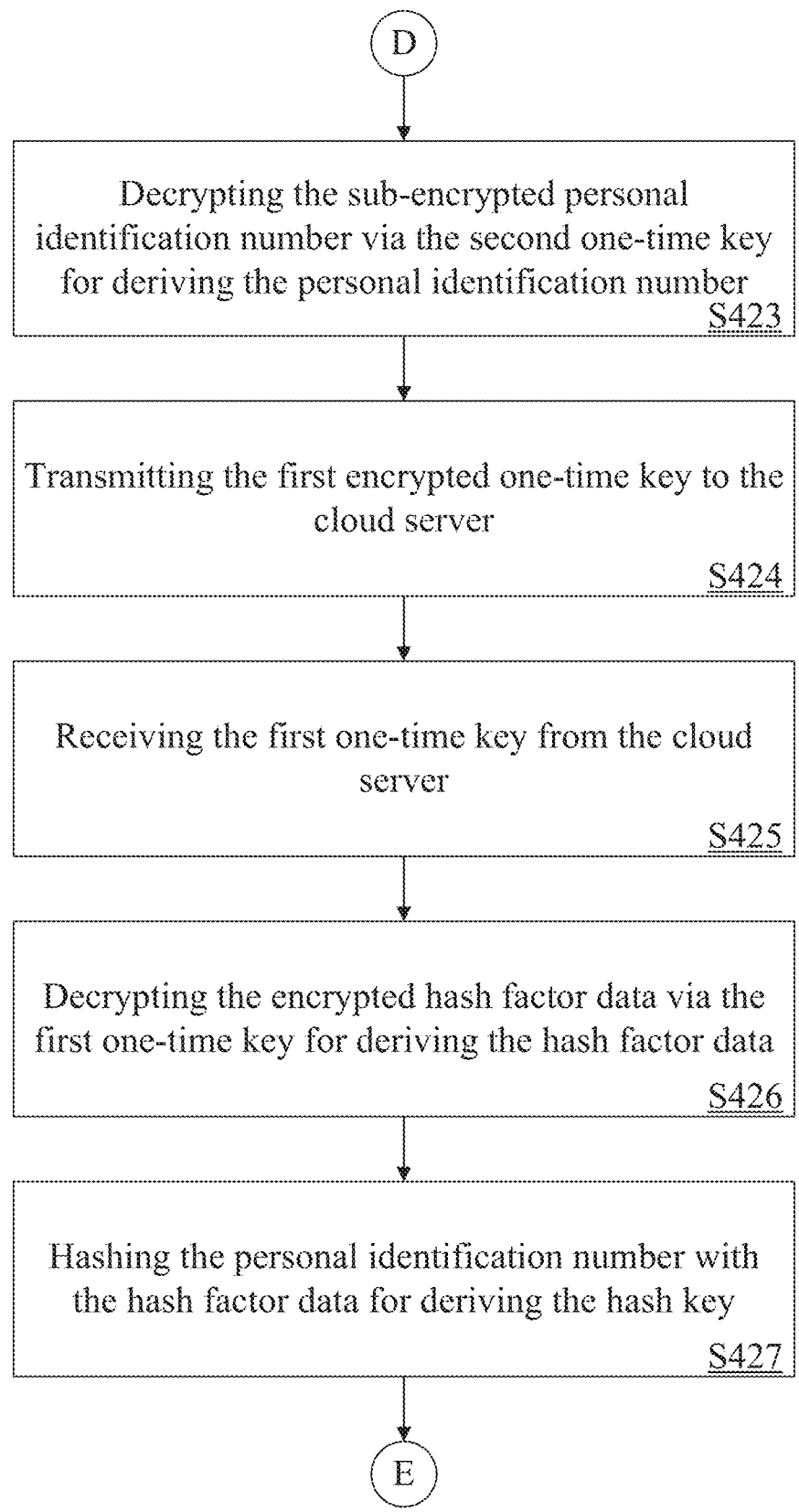
Figure 4H:
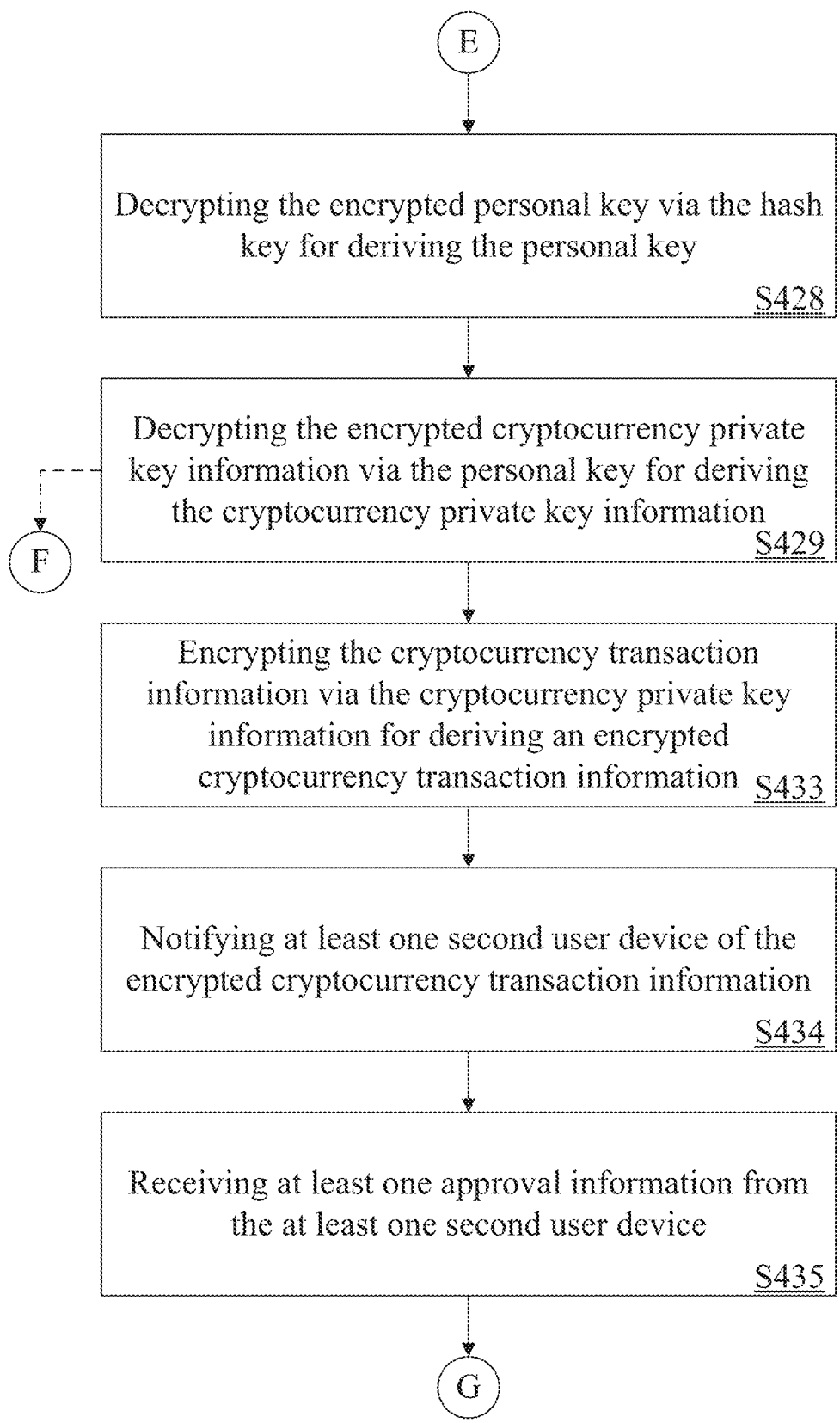
Figure 4I:
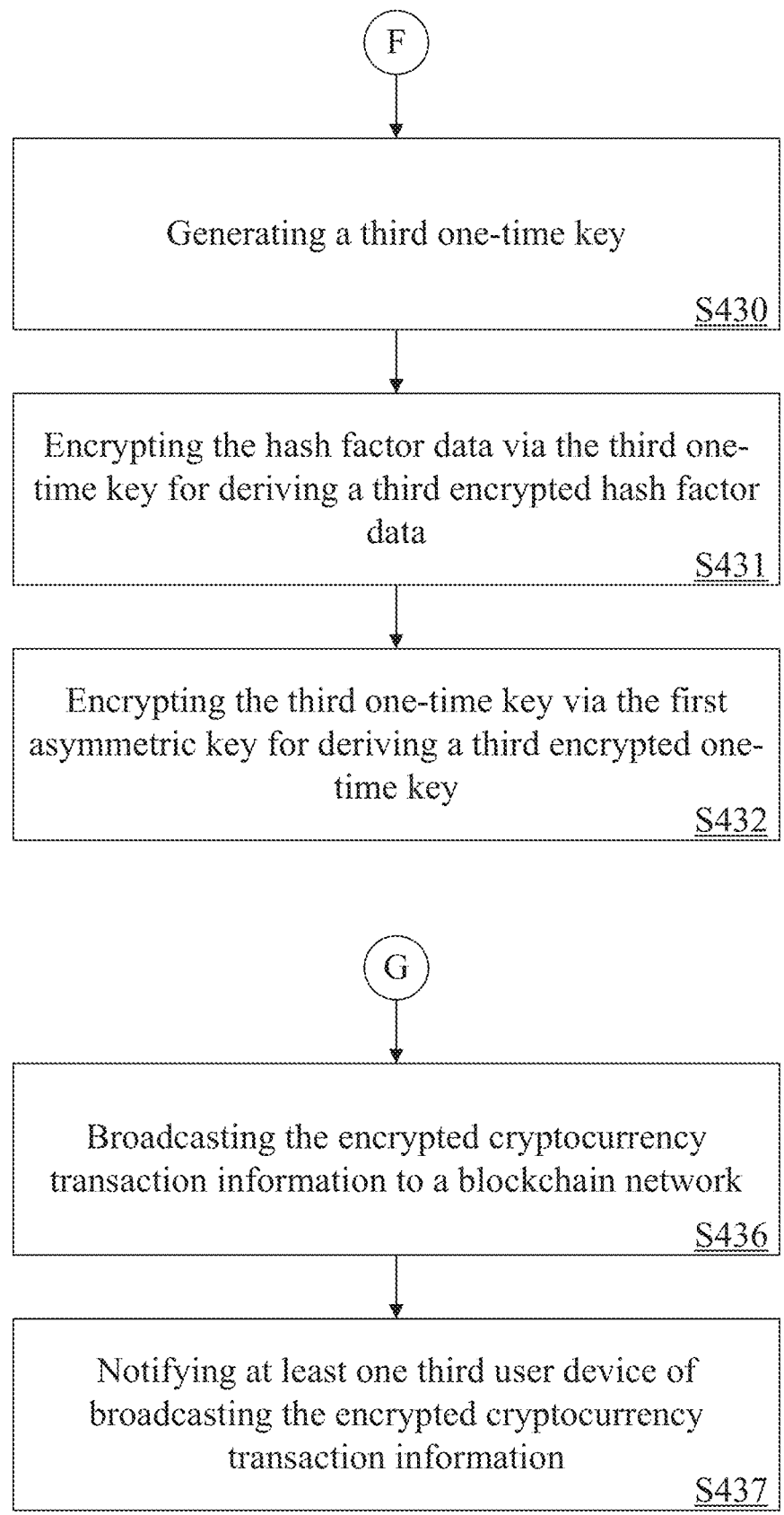

Some embodiments of the present disclosure include a cryptocurrency securing method, and flowchart diagrams thereof are as shown in FIG. 3. The method of some embodiments is for use in a cryptocurrency securing system (e.g., the cryptocurrency securing system of the aforesaid embodiments). Detailed operations of the cryptocurrency securing method are as follows.

Operation S301 is executed to receive, by the cryptocurrency securing system, a cryptocurrency transaction information from a first user device. Operation S302 is executed to determine, by the cryptocurrency securing system, whether a policy data corresponding to the cryptocurrency transaction information is legal. If the policy data corresponding to the cryptocurrency transaction information is not legal, the transaction is not further processed due to the potential risk. If the policy data corresponding to the cryptocurrency transaction information is legal, operation S303 is executed to derive, by the cryptocurrency securing system, a cryptocurrency private key information via a personal identification number of the first user device.

Operation S304 is executed to encrypt, by the cryptocurrency securing system, the cryptocurrency transaction information via the cryptocurrency private key information for deriving an encrypted cryptocurrency transaction information. Operation S305 is executed to broadcast, by the cryptocurrency securing system, the encrypted cryptocurrency transaction information to a blockchain network for fulfilling the cryptocurrency transaction.

Some embodiments of the present disclosure include a cryptocurrency securing method, and flowchart diagrams thereof are as shown in FIGS. 4A to 4I. The method of some embodiments is for use in a cryptocurrency securing system (e.g., the cryptocurrency securing system of the aforesaid embodiments). Detailed operations of the cryptocurrency securing method are as follows.

For initiation encryption procedure, operation S401 is executed to receive, by the cryptocurrency securing system, a personal identification number and a cryptocurrency private key information from a first user device. Operation S402 is executed to generate, by the cryptocurrency securing system, a personal key and a hash factor data corresponding to the personal identification number.

Next, operation S403 is executed to encrypt, by the cryptocurrency securing system, the cryptocurrency private key information via the personal key for deriving an encrypted cryptocurrency private key information. Operation S404 is then executed to hash, by the cryptocurrency securing system, the personal identification number with the hash factor data for deriving a hash key. The personal identification number with the hash factor data is hashed via a first hash function. Operation S405 is execute to encrypt, by the cryptocurrency securing system, the personal key via the hash key for deriving an encrypted personal key.

In some embodiments, operation S406 is executed to generate, by the cryptocurrency securing system, a first one-time key. Operation S407 is executed to encrypt, by the cryptocurrency securing system, the hash factor data via the first one-time key for deriving an encrypted hash factor data. Operation S408 is executed to encrypt, by the cryptocurrency securing system, the first one-time key via a first asymmetric key for deriving a first encrypted one-time key. After the encryptions, the initiation encryption procedure is finished.

In addition, for initiation authentication procedure, operation S409 is executed to receive, by the cryptocurrency securing system, a legal digital signature from a cloud server. In some embodiments, the legal digital signature may be derived based on a legal policy data of the first user device. In particular, the legal policy data of the first user device may be determined by a legal operator first, and the cloud server generates the legal digital signature by hashing the legal policy data via a second hash function. Operation S410 is executed to store, by the cryptocurrency securing system, the legal digital signature.

For utilization procedure, operation S411 is executed to receive, by the cryptocurrency securing system, the personal identification number from the first user device. Operation S412 is executed to determine, by the cryptocurrency securing system, whether the personal identification number corresponds to the first user device. If the personal identification number does not correspond to the first user device, the transaction is not further processed due to the potential risk. If the personal identification number corresponds to the first user device, operation S413 is executed to notify, by the cryptocurrency securing system, the cloud server of receiving the personal identification number. Accordingly, the cloud server determines whether the first user device is legal via receiving authentication information from the first user device.

In particular, when the cloud server is notified of that the cryptocurrency securing system receives the personal identification number of the first user device, the cloud server transmits a confirmation message (e.g., Short Message Service message), which contains a verification code, to the first user device. Then, the first user device may be determined legal by the cloud server when the first user device transmits the authentication information, which contains the verification code, back to the cloud serve. Next, the cloud server transmits a response to the cryptocurrency securing system for informing the cryptocurrency securing system of that the first user device is legal. Operation S414 is executed to receive, by the cryptocurrency securing system, the response from the cloud server for being informed that the first user device is legal.

After determining that the first user device is legal, S415 is executed to receive, by the cryptocurrency securing system, a cryptocurrency transaction information from the first user device. Operation S416 is executed to hash, by the cryptocurrency securing system, a policy data corresponding to the cryptocurrency transaction information for deriving a digital signature. Operation S417 is executed to determine, by the cryptocurrency securing system, whether the digital signature of the policy data matches the legal digital signature. If the policy data does not match the legal digital signature, the transaction is not further processed due to the potential risk. If the policy data matches the legal digital signature, the policy data corresponding to the cryptocurrency transaction information is legal.

Accordingly, operation S418 is executed to generate, by the cryptocurrency securing system, a second one-time key. Operation S419 is executed to encrypt, by the cryptocurrency securing system, the second one-time key via a second asymmetric key for deriving a second encrypted one-time key. Operation S420 is executed to transmit, by the cryptocurrency securing system, the encrypted second one-time key to the first user device.

Then, the first user device is capable of decrypting the second encrypted one-time key via a third asymmetric key paired with the second asymmetric key for deriving the second one-time key, and encrypting the personal identification number via the second one-time key and the third asymmetric key for deriving an encrypted personal identification number.

Next, operation S421 is executed to receive, by the cryptocurrency securing system, the encrypted personal identification number. Operation S422 is executed to decrypt, by the cryptocurrency securing system, the encrypted personal identification number via the second asymmetric key paired with the third asymmetric for deriving a sub-encrypted personal identification number. Operation S423 is executed to decrypt, by the cryptocurrency securing system, the sub-encrypted personal identification number via the second one-time key for deriving the personal identification number.

Further, operation S424 is executed to transmit, by the cryptocurrency securing system, the first encrypted one-time key to the cloud server. Hence, the cloud server is capable of decrypting the first encrypted one-time key via a fourth asymmetric key paired with the first asymmetric key for deriving the first one-time key, and transmits the first one-time key back to the cryptocurrency securing device. Operation S425 is executed to receive, by the cryptocurrency securing system, the first one-time key from the cloud server. Operation S426 is executed to decrypt, by the cryptocurrency securing system, the encrypted hash factor data via the first one-time key for deriving the hash factor data.

Afterwards, operation S427 is executed to hash, by the cryptocurrency securing system, the personal identification number with the hash factor data for deriving the hash key. Operation S428 is executed to decrypt, by the cryptocurrency securing system, the encrypted personal key via the hash key for deriving the personal key. Operation S429 is executed to decrypt, by the cryptocurrency securing system, the encrypted cryptocurrency private key information via the personal key for deriving the cryptocurrency private key information.

In addition, operations S430 to S432 are optionally executed. Operation S430 is executed to generate, by the cryptocurrency securing system, a third one-time key. Operation S431 is executed to encrypt, by the cryptocurrency securing device, the hash factor data via the third one-time key for deriving a third encrypted hash factor data. Operation S432 is executed to encrypt, by the cryptocurrency securing system, the third one-time key via the first asymmetric key for deriving a third encrypted one-time key. Therefore, the third encrypted one-time key is kept safely at the end of the cryptocurrency securing device since the third encrypted one-time key can only be decrypted by the cloud server who has the fourth asymmetric key.

Operation S433 is executed to encrypt, by the cryptocurrency securing system, the cryptocurrency transaction information via the cryptocurrency private key information for deriving an encrypted cryptocurrency transaction information. Operation S434 is executed to notify, by the cryptocurrency securing system, at least one second user device of the encrypted cryptocurrency transaction information. When the at least one second user device confirms that the transaction of the encrypted cryptocurrency transaction information should be approve, the at least one second user device transmits back at least one approval information to the cryptocurrency securing system.

Therefore, operation S435 is executed to receive, by the cryptocurrency securing system, the at least one approval information from the at least one second user device. Operation S436 is executed to broadcast, by the cryptocurrency securing system, the encrypted cryptocurrency transaction information to a blockchain network based on the at least one approval information. In addition, operation S437 is executed to notify, by the cryptocurrency securing system, at least one third user device of broadcasting the encrypted cryptocurrency transaction information to the blockchain network for fulfilling the cryptocurrency transaction.

According to the above descriptions, the cryptocurrency securing method and system of the present disclosure secure the cryptocurrency private key information via a more robust architecture of encryption/decryption, and process the cryptocurrency transaction in a safer way. Separating the devices of the system in different network sections makes the cyberattack more difficult. Further, the introduction of the cloud server could be used for damage control if the device was compromised.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A cryptocurrency securing system, comprising:
   a first apparatus, comprising:
      a storage device storing an encrypted one-time key, encrypted cryptocurrency private key information, encrypted personal key, and encrypted hash factor data;
      a first network interface; and
      a first controller, being configured to:
         receive, using the first network interface, a cryptocurrency transaction information from a first user device through a second apparatus;
         determine whether policy data corresponding to the cryptocurrency transaction information is compromised;
         in response to a determination that the policy data corresponding to the cryptocurrency transaction information has not been compromised:
            transmit the encrypted one-time key to a cloud server, wherein the encrypted one-time key is encrypted via an Advance Encryption Standard (AES);
            in response to receiving a decrypted version of the encrypted one-time key from the cloud server, decrypt the encrypted hash factor data using the decrypted version of the encrypted one-time key to derive a hash factor data;
            decrypt an encrypted personal key with a hash key derived from hashing a personal identification number of the first user device and the hash factor data using a hash function, to derive a personal key, wherein the hash function is a Secure Hash Algorithm (SHA);
            decrypt the encrypted cryptocurrency private key information using the personal key to derive a cryptocurrency private key;

encrypt the cryptocurrency transaction information using the cryptocurrency private key; and
transmit, using the first network interface, the encrypted cryptocurrency transaction information to a blockchain network through the second apparatus.

2. The cryptocurrency securing system of claim 1, further comprising:
the second apparatus, comprising:
a second network interface; and
a second controller configured to cause the second network interface to:
receive the cryptocurrency transaction information from the first user device; and
transmit the cryptocurrency transaction information to the first apparatus.

3. The cryptocurrency securing system of claim 1, further comprising:
the second apparatus, comprising:
a second network interface; and
a second controller configured to cause the second network interface to:
receive the encrypted cryptocurrency transaction information from the first apparatus; and
transmit the encrypted cryptocurrency transaction information to the blockchain network through a third apparatus.

4. The cryptocurrency securing system of claim 2, wherein:
the first apparatus operates in a first network section,
the second apparatus operates in a second network section, and
the first network section and the second network section are independent.

5. The cryptocurrency securing system of claim 3, further comprising:
the third apparatus, comprising:
a third network interface;
a third controller configured cause the third network interface to:
receive the encrypted cryptocurrency transaction information from the second apparatus; and
broadcast the encrypted cryptocurrency transaction information to the blockchain network.

6. The cryptocurrency securing system of claim 5, wherein:
the first apparatus operates in a first network section,
the second apparatus operates in a second network section,
the third apparatus operates in a third network section, and
the first network section, the second network section, and the third network section are independent.

7. The cryptocurrency securing system of claim 5, wherein the second controller is configured cause the second network interface to:
notify at least one second user device of the encrypted cryptocurrency transaction information;
receive at least one approval information from the at least one second user device after notifying the at least one second user device of the encrypted cryptocurrency transaction information; and
transmit the encrypted cryptocurrency transaction information to the blockchain network through the second apparatus and then the third apparatus based on the at least one approval information.

8. The cryptocurrency securing system of claim 3, wherein the second controller is configured to cause the second network interface to notify at least one third user device of transmitting the encrypted cryptocurrency transaction information to the blockchain network.

9. The cryptocurrency securing system of claim 1, wherein:
the storage device stores a digital signature, and
the first controller is further configured to:
hash the policy data for deriving a digital signature; and
determine the policy data corresponding to the cryptocurrency transaction information has not been compromised based on the digital signature of the policy data matching the digital signature.

10. The cryptocurrency securing system of claim 9, wherein the digital signature is generated by the cloud server based on policy data, and the first controller is configured to:
receive, using the first network interface, the digital signature from the cloud server; and
store the digital signature in the storage device.

11. The cryptocurrency securing system of claim 2, wherein the second controller is configured to cause the second network interface to:
receive the personal identification number from the first user device;
transmit the personal identification number to the first apparatus,
wherein the first controller is configured to:
determine whether the personal identification number corresponds to the first user device; and
in response to a determination that the personal identification number corresponds to the first user device, receive the cryptocurrency transaction from the first user device.

12. The cryptocurrency securing system of claim 2, wherein the second controller is configured cause the second network interface to:
receive the personal identification number from the first user device;
transmit the personal identification number to the first apparatus;
wherein the first controller is configured to:
determine whether the personal identification number corresponds to the first user device;
in response to a determination that the personal identification number corresponds to the first user device, notify the cloud server of receiving the personal identification number to cause the cloud server to determine whether the first user device is compromised; and
in response to receiving a notification from the cloud server that the first user device is nor compromised, further process the cryptocurrency transaction information received from the first user device.

13. A cryptocurrency securing method for use in a cryptocurrency securing system, the method comprising:
receiving, by the cryptocurrency securing system, a cryptocurrency transaction information from a first user device;
determining, by the cryptocurrency securing system, whether a policy data corresponding to the cryptocurrency transaction information has been compromised;
in response to a determination that the policy data corresponding to the cryptocurrency transaction information has not been compromised:
transmitting an encrypted one-time key to a cloud server, wherein the encrypted one-time key is encrypted via an Advance Encryption Standard (AES);

in response to receiving a decrypted version of the encrypted one-time key from the cloud server, decrypting encrypted hash factor data using the decrypted version of the encrypted one-time key to derive a hash factor data;

decrypting an encrypted personal key with a hash key derived from hashing a personal key with a hash key derived from hashing a personal identification number of the first user device and the hash factor data using a hash function, to derive a personal key, wherein the hash function is a Secure Hash Algorithm (SHA);

decrypting, by the cryptocurrency securing system, an encrypted cryptocurrency private key information using the personal key cryptocurrency private key;

encrypting, by the cryptocurrency securing system, the cryptocurrency transaction information using the cryptocurrency private key; and broadcasting, by the cryptocurrency securing system, the encrypted cryptocurrency transaction information to a blockchain network.

14. The method of claim 13, further comprising:
notifying, by the cryptocurrency securing system, at least one second user device of the encrypted cryptocurrency transaction information; and
receiving, by the cryptocurrency securing system, at least one approval information from the at least one second user device after notifying the at least one second user device of the encrypted cryptocurrency transaction information,
wherein the encrypted cryptocurrency transaction information is broadcasted to the blockchain network based on the at least one approval information.

15. The method of claim 13, wherein:
the cryptocurrency securing system stores a digital signature, and
determining whether the policy data corresponding to the cryptocurrency transaction information has been compromised further comprises:
hashing, by the cryptocurrency securing system, the policy data to derive a digital signature; and
determining, by the cryptocurrency securing system, that the policy data corresponding to the cryptocurrency transaction information has not been compromised based on determining that the digital signature of the policy data matches the digital signature.

16. The method of claim 15, wherein:
the digital signature is generated by the cloud server based on policy data, and
the method further comprises:
receiving, by the cryptocurrency securing system, the digital signature from the cloud server; and
storing, by the cryptocurrency securing system, the digital signature.

17. The method of claim 13, further comprising notifying, by the cryptocurrency securing system, at least one third user device of broadcasting the encrypted cryptocurrency transaction information to the blockchain network.

18. The method of claim 13, further comprising:
receiving, by the cryptocurrency securing system, the personal identification number from the first user device; and
determining, by the cryptocurrency securing system, whether the personal identification number corresponds to the first user device,
wherein the cryptocurrency transaction information is received from the first user device when the personal identification number corresponds to the first user device.

19. The method of claim 13, further comprising:
receiving, by the cryptocurrency securing system, the personal identification number from the first user device;
determining, by the cryptocurrency securing system, whether the personal identification number corresponds to the first user device;
in response to the personal identification number corresponding to the first use device, notifying, by the cryptocurrency securing system, the cloud server to cause the cloud server to determine whether the first user device is compromised; and
in response to receiving, by the cryptocurrency securing system, a notification from the cloud server indicating that the first user device is not compromised, further processing the cryptocurrency transaction information received from the first user device.

20. The cryptocurrency securing system of claim 3, wherein:
the first apparatus operates in a first network section,
the second apparatus operates in a second network section, and
the first network section and the second network section are independent.

* * * * *